(12) United States Patent
Harigaya et al.

(10) Patent No.: US 6,770,346 B2
(45) Date of Patent: Aug. 3, 2004

(54) OPTICAL RECORDING MEDIUM AND RECORDING METHOD

(75) Inventors: Makoto Harigaya, Kanagawa (JP); Hiroshi Miura, Kanagawa (JP); Hiroko Okura, Kanagawa (JP); Miku Mizutani, Kanagawa (JP); Eiko Hibino, Kanagawa (JP); Hajime Yuzurihara, Kanagawa (JP); Yoshiyuki Kageyama, Kanagawa (JP); Mikiko Abe, Kanagawa (JP); Hiroshi Deguchi, Kanagawa (JP); Kazunori Ito, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 11 days.

(21) Appl. No.: 10/151,324

(22) Filed: May 20, 2002

(65) Prior Publication Data

US 2003/0012917 A1 Jan. 16, 2003

(30) Foreign Application Priority Data

| May 21, 2001 | (JP) | ........................................ | 2001-151129 |
| Sep. 21, 2001 | (JP) | ........................................ | 2001-290036 |
| Feb. 13, 2002 | (JP) | ........................................ | 2002-035131 |
| Apr. 16, 2002 | (JP) | ........................................ | 2002-113269 |

(51) Int. Cl.$^7$ .............................................. B32B 3/02
(52) U.S. Cl. ................. 428/64.1; 428/64.5; 430/270.13
(58) Field of Search .............................. 428/64.1, 64.4, 428/64.5, 64.6, 913; 430/270.13, 495.1, 945; 369/283, 288

(56) References Cited

U.S. PATENT DOCUMENTS

| 5,688,574 A | * 11/1997 | Tamura ..................... 428/64.1 |
| 5,732,062 A | 3/1998 | Yokoi et al. |
| 5,736,657 A | 4/1998 | Ide et al. |
| 5,740,149 A | 4/1998 | Iwasaki et al. |
| 5,761,179 A | 6/1998 | Iwasaki et al. |
| 5,847,466 A | 12/1998 | Ito et al. |
| 5,875,160 A | 2/1999 | Harigaya et al. |
| 5,912,104 A | 6/1999 | Hirotsune et al. |
| 5,948,496 A | 9/1999 | Kinoshita et al. |
| 5,976,971 A | 11/1999 | Kinpara et al. |
| 6,096,398 A | 8/2000 | Yuzurihara et al. |
| 6,177,167 B1 | 1/2001 | Yuzurihara et al. |
| 6,221,557 B1 | 4/2001 | Harigaya et al. |
| 6,319,368 B1 | 11/2001 | Ide et al. |
| 6,391,417 B1 | 5/2002 | Yuzurihara et al. |
| 6,426,936 B1 | 7/2002 | Shinotsuka et al. |
| 2002/0021643 A1 | 2/2002 | Miura et al. |

FOREIGN PATENT DOCUMENTS

| EP | 1058249 | 12/2000 |
| JP | 1277338 | 11/1989 |
| JP | 1303643 | 12/1989 |

(List continued on next page.)

OTHER PUBLICATIONS

Copy of U.S. patent application No. 09/655,473 filed on Sep. 20, 2000.

(List continued on next page.)

*Primary Examiner*—Elizabeth Mulvaney
(74) *Attorney, Agent, or Firm*—Cooper & Dunham LLP

(57) ABSTRACT

An optical recording medium comprising a recording layer which comprises a phase-change recording material causing a reversible phase change between a crystalline phase and an amorphous phase by irradiation with an electromagnetic wave, wherein the phase-change recording material mainly comprises materials expressed by the composition formula $X\alpha Ge\beta Mn\gamma Sb\delta Te\epsilon$ with each of the components respectively fulfills $0 \leq \alpha \leq 5$, $1 \leq \beta \leq 5$, $1 \leq \gamma \leq 10$, $65 \leq \delta < 80$, $15 \leq \epsilon \leq 25$, and $\alpha \leq \gamma$ (where X expresses at least one of Ga and Sn, $\alpha$, $\beta$, $\gamma$, $\delta$, and $\epsilon$ expresses atomic percentage, and fulfills $\alpha+\beta+\gamma+\delta+\epsilon=100$).

30 Claims, 7 Drawing Sheets

FOREIGN PATENT DOCUMENTS

| | | |
|---|---|---|
| JP | 8127176 | 8/1990 |
| JP | 3231889 | 10/1991 |
| JP | 4191089 | 7/1992 |
| JP | 4232779 | 8/1992 |
| JP | 4267192 | 9/1992 |
| JP | 08127176 | 5/1996 |
| JP | 09134525 | 5/1997 |
| JP | 200079761 | 3/2000 |
| JP | 2000313170 | 11/2000 |
| WO | WO 0072316 | 11/2000 |
| WO | WO0072316 A1 | 11/2000 |

OTHER PUBLICATIONS

Copy of U.S. patent application No. 09/534,183 filed on Mar. 24, 2000.

Copy of U.S. patent application No. 09/568,723 filed on May 11, 2000.

Copy of U.S. patent application No. 09/498,375 filed on Feb. 4, 2000.

Copy of U.S. patent application No. 09/539,865 filed on Mar. 31, 2000.

Copy of U.S. patent application No. 10/071,068 filed on Feb. 7, 2002.

Copy of U.S. patent application No. 10/062,885 filed on Jan. 31, 2002.

Copy of U.S. patent application No. 09/966,171 filed on Sep. 28, 2001.

Copy of U.S. patent application No. 09/821,204 filed on Mar. 29, 2001.

* cited by examiner

OPTICAL RECORDING MEDIUM AND RECORDING METHOD

BACKGROUND OF THE INVENTION

1. Field of the Invention

The present invention relates to phase-change optical recording medium recordable and reproducible of information by optically changing a recording layer material by optical beam irradiation, and also rewritable, and a recording method thereof.

2. Description of the Related Art

As one of optical information recording media which is recordable, reproducible, and erasable of information by irradiation of laser beam, a so-called phase-change optical recording medium utilizing transition between crystal-amorphous phase or crystal—crystal phase is well known. Such recording medium has been utilized as recording medium for computers or image and sound related devices for its capability of overwriting with single beam and for its simple structure compared to an optical system of a drive unit.

The recording materials thereof include GeTe, GeTeSe, GeTeS, GeSeS, GeSeSb, GeAsSe, InTe, SeTe, SeAs, Ge—Te—(Sn, Au, Pd), GeTeSeSb, GeTeSb, Ag—In—Sb—Te, and the like. Particularly, Ag—In—Sb—Te has characteristic of high sensitivity and a clear profile of amorphous part, and is developed as a recording layer for mark edge recording.

In Japanese Patent Application Laid-Open No. 3-231889, for example, a recording layer represented by an I·(III1−γV γ)·VI type general formula wherein I is an element of the group I, III is an element of the group III, V is an element of the group V, and VI is an element of the group VI is disclosed. However, such a recording layer has a problem in repetitive recording property.

The recording layer used in information recording medium disclosed in Japanese Patent Application Laid-Open No. 4-191089 has a problem also in repetitive recording property although improvement in erasing ratio and high-speed recording can be attained.

The unrecorded part (crystallized part) of the recording layer used in information recording medium disclosed in Japanese Patent Application Laid-Open No. 4-232779 has a structure including a stable phase ($AgSbTe_2$) and an amorphous phase present around the stable phase. Therefore, a minute grain boundary is present in the crystallized part, causing noises, although the repetitive recording property can be improved. This does not have a serious adverse effect on the recording property of optical recording medium having relatively low recording density such as CD-RW (Compact Disk-Rewritable) using a laser beam of recording and reproducing wavelength about 780 nm, but is an obstacle to the realization of high-density recording in DVD (Digital Versatile Disk)-RAM using a laser beam of 680 nm or less and having a recording density about 4 times CD-RW, further high-density DVD-RW, and the like. A problem is left also for repetitive recording property.

The structure of the crystallized part of the recording layer utilized in Japanese Patent Application Laid-Open No. 4-267192 is in the multi-phase state of $AgSbTe_2$ phase separated from a uniform amorphous phase and the other phase (stable phase or amorphous phase). When the other phase above mentioned is the amorphous phase, it has the similar problem with the information recording medium in Japanese Patent Application Laid-Open No. 4-232779 described above, and when the other phase is the stable crystal phase, the problem arises in that the satisfying recording property cannot be obtained.

In Japanese Patent Application Laid-Open No. 1-277338, a composition expressed by the composition formula ($Sb_xTe_{1-x}$) are disclosed as the recording material, wherein M is at least one element selected from Ag, Al, As, Au, Bi, Cu, Ga, Ge, In, Pb, Pt, Se, Si, Sn and Zn with composition range of $0.4 \leq x < 0.7$ and $y \leq 0.2$. The structure of this composition range is based on $Sb_2Te_3$. The recording layer of this structure has a problem in repetitive recording property in the region where y is 0.7 or more.

In Japanese Patent Application Laid-Open No. 1-303643, it is taught that a single γ-phase was obtained and satisfying repetition property was obtained for the information recording media disclosed therein. However, it does not refer to the crystalline structure of this γ-phase, and thus has a problem in realizing a recording media conformable to high linear velocity and high density in the future.

In Japanese Patent Application Laid-Open No. 2000-79761, a recording layer approximating SbTe eutectic composition is disclosed. The recording layer disclosed therein utilizes the phase separation of Sb phase and $Sb_2Te_3$ phase. Sb is determined in the range of 0.5 or more and 0.7 or less, thus it is not conformable to high-linear velocity recording.

Recording medium utilizing a reversible phase change between a crystalline phase and an amorphous phase has been internationally utilized in rewritable recording media (CD-RW, etc.). For use in CD-RWs, speeding up in recording has been required accompanying the wide use, and the high-speed recording became also indispensable for the phase-change recording medium.

In high-speed recording, or in recording at a high linear velocity, the reference clock of the emitting pulse of laser beam is shortened in accordance with the increase in recording density. Therefore, in order to form a mark (amorphous phase), both the emitting (heating) time of one optical pulse and the time of emitting a lower power necessary for cooling (or often emitting no power) are shortened, compared to the recording at a lower linear velocity.

Further, in an optical recording which utilizes LD (laser diode), since the rise time and the fall time of the LD are limited, it is difficult to form a mark by heating and cooling at one optical pulse. For this reason, the heating can be performed by emission of higher recording power, however the recording power has a limit in recording. Also a certain cooling time should be considered for rapid quenching to be carried out after heating, however, the cooling time cannot be assigned too long. It is thus difficult to control the heating and cooling within the reference clock to record a mark of a prescribed length at a higher linear velocity.

On the other hand, it is also required to optimize the recording material of the phase-change recording layer and the medium structure.

In order ensure the repetitive recording property in high-speed recording, the crystallization rate (or crystallization speed) must be increased to raise the erasing ratio, and it is necessary to optimize the recording layer material and the composition ratio of each constituting element.

When the crystallization rate (or crystallization speed) is too high, however, the amorphous phase is difficult to form. In this case, the medium structure may be arranged to form a quench structure, but the recording power is also required. In Ag—In—Sb—Te series and Sb—Te eutectic series, although the crystallization rate can be increased by increasing Sb quantity, it makes difficult to form the amorphous phase, and also deteriorates the storage property under high-temperature environment of mark, if an increase in the quantity is too much. When the medium structure is arranged to form the quench structure, a problem of deficiency in sensitivity arises. The causes of the deterioration in repetitive recording property in the high-speed recording include deterioration of not only the recording layer but also the upper protection layer located between the recording layer and the reflection layer, or dispersion of the constituting elements in the recording film or cracking of the protection layer by thermal impact, due to repetition of heating under high temperature and cooling in a short time. To cope with the speed up, studying of recording layer material, protection layer material and reflection layer material are required. For the same reason, study of recording method is also necessary.

Known recording layer materials conformable to high-linear velocity recording include for example, the one disclosed in Japanese Patent Application Laid-Open No. 2000-313170. Namely, it is expressed by the formula [(SbxTe1-x)yGe1-y]zM1-z, wherein M is In and/or Ga with a linear velocity about 7 times CD linear velocity and, particularly, a recording layer material consisting of 4 elements of Ge, In, Sb and Te is described as preferable example. However, when In is excessively added, it may speed up the linear velocity although an increase in reproducing optical power accompanies deterioration in both reproducing and repetition properties. Hence, the linear velocity cannot be increased too much.

On the other hand, in a recording method accompanying high-density and high-linear velocity recording, means for solving a problem caused by the rise time and the fall time became approximately equal to the heating pulse time is disclosed in Japanese Patent Application Laid-Open No. 9-134525. The technique disclosed herein relates to determination of a heating and cooling time of a single optical pulse to become equal to or more than the reference clock, and on the contrary, reducing the number of pulses to obtain a prescribed mark length, thereby improving the recording sensitivity and modulation factor.

These prior arts are mainly applied to rewritable CD, and even if applied to higher-density and higher-linear velocity recording, sufficient performances cannot be obtained.

A technique in terms of applying the above mentioned technique to high-linear velocity recording is disclosed in International Application Laid-Open WO 0072316. However, this technique also is not sufficient, and it is necessary to find out a technique having higher applicability and wider margin.

SUMMARY OF THE INVENTION

An object of the present invention is to provide a phase-change optical recording medium which performs a high-density recording at extensive linear velocities ranging from 3.5 m/s to a maximum of about 20 m/s, specifically 2 to 5-fold velocity (7.0–17.5 m/s) of the DVD, and further, to a phase-change optical recording medium easy in initial crystallization and excellent in repetition and storage properties, and a recording method thereof.

DESCRIPTION OF THE PREFERRED EMBODIMENTS

The present invention is further described in detail.

Figure 1:
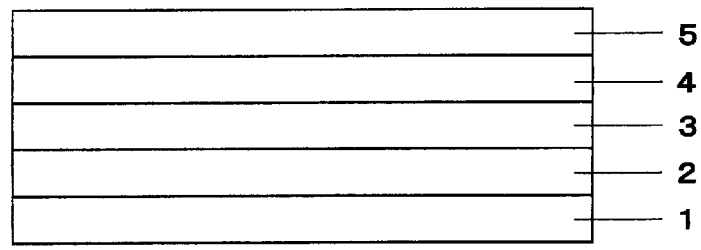
FIG. 1 is a cross-sectional view showing a basic structural example of optical recording media according to the present invention.
Figure 2:
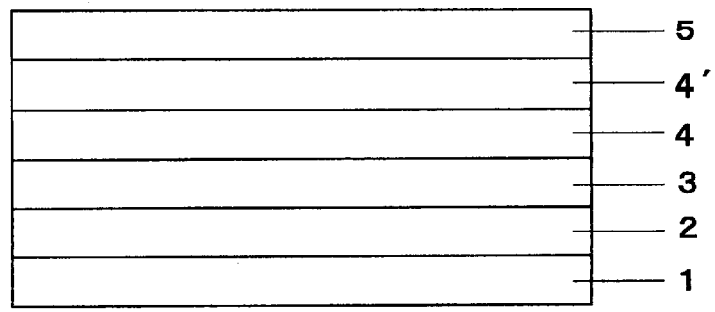
FIG. 2 is a cross-sectional view showing another structural example of an optical recording media according to the present invention.

The structure of recording medium according to the present invention includes at least a lower protection layer 2, a recording layer 3 causing a reversible phase change between an amorphous phase and a crystalline phase, an upper protection layer 4 and a reflection layer 5 successively provided on a substrate 1 in that order, as shown in FIG. 1. Another layer may be suitably provided in between these layers or on the top layer as long as the gist of the present invention is not impaired. Each layer described above, for example, the upper protection layer may be formed of two layers or more, for instance, comprising an upper second protection layer 4A as shown in FIG. 2.

Conventionally, for the phase-change recording layer, AgInSbTe-based and AgInSbTeGe-based materials based on an eutectic composition approximating $Sb_{70}Te_{30}$ have been used because of satisfying recording properties. In these materials, however, there are problems left unsolved in practical use such that the larger the ratio of Sb becomes against Te, the larger the crystallization rate becomes, and when the Sb quantity exceeds around 80%, the crystallization rate increases, but the storage property deteriorates and make formation of a recording mark difficult.

As result of earnest studies on these points, the present inventors have found that various problems can be solved by using recording materials related to the following first to third embodiments.

In the first embodiment of the present invention, a material expressed by the composition formula $X\alpha Ge\beta Mn\gamma Sb\delta Te\epsilon$ (where X expresses at least one of Ga and/or Sn, $\alpha$, $\beta$, $\gamma$, $\delta$, and $\epsilon$ expresses atomic percentage, and fulfills $\alpha+\beta+\gamma+\delta+\epsilon=100$) is used as the main component of a recording material. The main component herein means that it occupies 99 wt % or more of the whole recording material and fulfills $0\leq\alpha\leq5; 1\leq\beta\leq5; 1\leq\gamma\leq10; 65\leq\delta<80; 15\leq\epsilon\leq25$; and $\alpha\leq\gamma$.

In order to cope with high-linear velocity recording, it is preferred to determine Sb quantity $\delta$ to fulfill $65\leq\delta<80$ and the Te quantity $\epsilon$ to fulfill $15\leq\epsilon\leq25$.

Ge can improve the storage property of the recorded mark under high temperature environment although the crystallization rate is low. It has satisfying storage property due to particularly large bonding energy between the Ge—Te and increased crystallization temperature accompanying addition of the Ge. However, since the excessive addition leads to a further rise of crystallization temperature whereas deteriorates the crystallization rate, the adding quantity has a limitation. Accordingly, the Ge quantity β is preferably determined to meet $1 \leq \beta \leq 5$.

Conventionally used Ag stabilizes the recording mark, but the effect in increasing the crystallization temperature cannot be expected so much. Since the excessive addition reduces the crystallization rate, consequently, Ag cannot be added too much. In improves the storage property since it enhances the crystallization rate and raises the crystallization temperature, it easily segregates and causes deterioration in repetitive overwrite property and deterioration in reproducing optical power.

Accordingly, it is necessary to reexamine the AgInSbTeGe-based and AgInSbTe-based materials with respect to the high-linear velocity recording at the 2-fold velocity or more of DVD. The present inventors thus examined for elements to substitute Ag and In.

The elements having the same effect as In includes Ga. Ga increases the crystallization rate as compared with In of the same quantity, however cannot be added so much since the crystallization temperature also increases. When Ge is 5 atomic percentage, and Ga is 6 atomic percentage or more, the crystallization temperature exceeds 200° C. by far and reaches as high as 250° C. or higher. Therefore, in the initialization process for crystallizing the recording layer from the amorphous state, when the reflection ratio is reduced, the reflection ratio distribution of a round of track is increased, thereby causing deterioration of recording property or data error, hence the initialization becomes difficult. Accordingly, Ga preferably does not exceed 5 atomic percentage in combined use with Ge as adopted in this embodiment.

As a result of extensive studies on rare earth, alkali earth and transition metal elements as the element capable of increasing the crystallization rate but not raising the crystallization temperature more than it is required, the present inventors found that Mn and Sn are effective. Particularly, Mn can raise the crystallization rate similarly to In, but does not deteriorate overwrite property even if added in large amount, and also provides satisfying storage property. Although it may also raise the crystallization temperature, the increase in crystallization temperature against added quantity is small. The deterioration in reproducing light can also be minimized.

Sn increases the crystallization rate more than M, however the overwrite property deteriorates when added too much.

The above knowledge shows that the crystallization rate can be adjusted by adding Ga and/or Sn on the basis of a GeMnSbTe-based material.

The adding quantity of Ga and/or Sn is preferably determined at 5 atomic percentage ($0 \leq \alpha \leq 5$) or lower, more preferably, 1–3 atomic percentage ($1 \leq \alpha \leq 3$) since the excessive addition causes problems as described above.

Mn can raise the crystallization temperature, and does not deteriorate the overwrite property even if added in large amount, and further exhibits satisfying storage property. The increase in the crystallization temperature against adding quantity is small, the initialization prior to recording (the process of phase change from amorphous phase to crystalline phase) is facilitated, and the deterioration in the storage property and repetitive reproducing light emission can be also minimized. The adding quantity may be determined at 1–10 atomic percentage ($1 \leq \gamma \leq 10$), preferably, 3–7 atomic percentage ($3 \leq \gamma \leq 7$), since the effect is not remarkable with less than 1 atomic percentage, and Mn precipitates without solving when exceeding 10 atomic percentage.

When the adding quantity of Ga and/or Sn is larger than that of Mn, the crystallization rate improves, on the other hand, the rise in crystallization temperature increases and makes initialization difficult, resulting in unbalanced recording property depending on the position of recording, or the deterioration in the property itself and, further, since the storage property can be satisfied by addition of Mn. Accordingly, the Mn quantity desirably does not exceed the Mn quantity ($\alpha \leq \gamma$).

To obtain a recording layer easily initializable and having satisfying recording property, the crystallization temperature at temperature rise rate of 10° C./min is preferably determined within the range of 150–220° C. When the temperature is lower than 150° C., the recording mark is easily erased under high temperature environment. When the temperature exceeds 220° C., a uniform crystalline phase cannot be formed at initialization, and leads to deterioration in the recording property, or unobtainable reflection ratio necessary due to insufficient crystal growth. The crystallization temperature at temperature rise rate of 10° C./min., referred herein means the temperature rise rate in measurement by differential scanning calorimetric analyzing method.

The film thickness of the recording layer of the first embodiment is preferably determined within the range of 10–25 nm. When it is too thin, the modulation factor or reflection ratio may be reduced, and when it is too thick, the recording sensitivity or repetitive recording property may deteriorate.

In the optical recording medium according to the first embodiment, the tracking stability in a DVD-ROM player deteriorates when the reflection ratio is reduced or the modulation factor is minimized. Therefore, the thickness of the recording layer cannot be reduced in order to keep the interchangeability with the DVD-ROM.

In the second embodiment of the present invention, a material expressed by the composition formula Ge$\kappa$Ga$\lambda$Mn$\mu$Sbv Te$\xi$(where $\kappa, \lambda, \mu, \nu$ and $\xi$ express atomic percentage, and $\kappa+\lambda+\mu+\nu+\xi=100$) is used as the main component of the recording material, which is found out by performing a structural analysis for a number of recording materials comprising various elements added to SbTe. The main component referred herein means that it occupies 99 wt % or more of the whole recording material, with $1 \leq \kappa \leq 5$; $1 \leq \lambda \leq 5$; $1 \leq \mu \leq 10$; $65 \leq \nu \leq 81$; and $13 \leq \xi \leq 24$.

Here, $\kappa \leq 5$ is preferred from the viewpoint of enabling high linear velocity recording and to attain higher crystallization rate, while $\kappa \leq 1$ is preferred to obtain sufficient effect of an added element. On the other hand, $\lambda \leq 5$ is preferred from the viewpoint of suppressing phase separation, and $1 \leq \lambda$ is preferred to obtain sufficient effect of an added element. Further, $\mu \leq 10$ is preferred from the viewpoint of suppressing phase separation, and $1 \leq \mu$ is preferred to obtain sufficient effect of an added element. $65 \leq \nu$ is preferred from the viewpoint of enabling high linear velocity recording and to attain higher crystallization rate, while $\nu \leq 81$ is preferred from the viewpoint of suppressing phase separation. Finally, $13 \leq \xi$ is preferred from the viewpoint of suppressing phase separation, and $\xi \leq 24$ is preferred from the viewpoint of enabling high linear velocity recording Further, it was found that the structure of the recording layer is varied, even with recording materials comprising the same elements, depending on target forming method, sputtering condition, and initial crystallization condition at the time of film formation, and accordingly varies the signal characteristic and storage property of the resulting recording medium. The structural analysis of a recording layer of a recording medium having satisfying recording property showed that the crystalline phase of the recording layer has a statistic NaCl-type structure which exhibits disturbances allowing entrance of every atom constituting the recording layer in the Na-site and Cl-site, and is characterized by the distortion of the crystalline phase which is the statistic NaCl-type structure.

Figure 3:
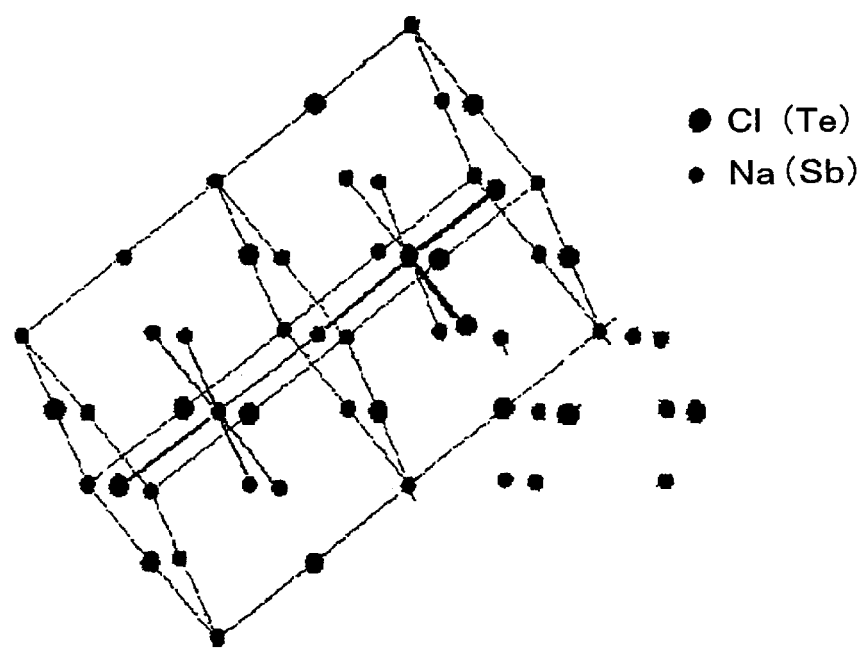
FIG. 3 is a view showing a distorted statistic NaCl-type structure of the present invention.

FIG. 3 shows a face-centered cubic NaCl-type structure. A natural NaCl-type structure comprises Na represented by a small circle and Cl represented by a large circle regularly located on respective sites.

In contrast, the recording material of the second embodiment of the present invention mainly comprises Sb and Te, and has a structure where Sb is located in the Na-site and Te is located in the Cl-site. However, since the Sb quantity is larger than Te quantity, a disordered structure having Sb entered in the Te-site, thus losing a structural order is formed.

On the other hand, the elements other than Sb and Te enter the Sb-site or Te-site in a bonded-state to Ge, Ga or Mn since they are easily bondable to Te.

Consequently, Sb—Te bond, Sb—Sb bond, Te—Te bond, Te—Ge bond, Te—Ga bond, and Te—Mn bond are formed. Since bond distance of adjoining atoms around Sb is longer than the bond distance of adjoining atoms around Te on the basis of analysis in the local structure by X-ray or the like, the structure is locally distorted.

Although it is presently under analysis why the distorted statistic NaCl-type structure exhibits satisfying properties as the phase-change recording material, it is assumed that the vitrified state or recording state be unstable in an orderly NaCl-type structure having a pore in the Te-site, since the degree of short-distance order of this structure at the time of vitrification by recording drops as compared to the degree of short-distance order of the statistic NaCl-type structure having Te-site filled with Sb When Ge, Ga, or Mn is not securely bonded to Te, the repetition property and storage property remarkably deteriorates since a unitary statistic NaCl structure cannot be obtained, and the phase separation in a phase mainly comprising SbTe and in a phase mainly comprising Ge, Ga or Mn is apt to occur.

In the second embodiment of the present invention, high-linear velocity recording can be realized by increasing the Sb quantity and adding Ga and Mn. Ga not only increases the crystallization rate but also raises the crystallization temperature. The rise of crystallization temperature is preferable from the viewpoint of storage property, but an excessively high crystallization temperature makes the initial crystallization difficult. As result of examinations, the present inventors found that the crystallization rate increases without raising the crystallization temperature when Mn is added, and made success in obtaining a desired crystallization temperature by adding Mn and Ga simultaneously. Since Mn is less effective in increasing the crystallization rate than Ga, it is preferred to add Ga as well in order to attain a 17 m/s-recording.

When the crystallization temperature at temperature rise rate of 10° C./min is less than 150° C., the storage property deteriorates, and when the crystallization temperature exceeds 200° C., initial crystallization becomes difficult.

When the crystallization rate is high, the sensitivity tends to be insufficient because higher cooling rate is required to obtain the amorphous. In the present invention, however, the sensitivity can be improved without sacrificing other properties for recording materials having melting points of 530–560° C. When the melting point is less than 530° C., the storage property and stability of reproducing light deteriorate, and when the melting point exceeds 560° C., the sensitivity deteriorates.

The film thickness of the recording layer of the second embodiment is determined at 10–100 nm, and preferably, 10–30 nm. When the thickness is less than 10 nm, light adsorptivity deteriorates and loses function as recording layer. When the thickness is greater than 100 nm, an interference effect cannot be expected since the light transmittance is minimized.

In the third embodiment of the present invention, a material expressed by the composition formula $A\phi D\chi Sb\phi Te\omega$ (where A expresses at least one element selected from Ge, B and C; D expresses one or a plurality of elements having a ratio of ionicity to Te within the range of 5–28%; $\phi, \chi, \phi$, and $\omega$ express atomic percentage; and fulfills $\phi+\chi+\phi+\omega=100$) is used as the main component of the recording material. The main component herein means that it occupies 99 wt % or more of the whole recording material, with $2 \leq \phi \leq 8$, $3 \leq \chi \leq 10$, $60 \leq \phi \leq 80$, and $15 \leq \omega \leq 30$.

By using such materials, optical recording medium conformable to higher linear velocity and higher density, and excellent in repetition property and storage property can be obtained.

In the above composition formula, $2 \leq \phi$ is preferable from the viewpoint of storage property, and $\phi \leq 8$ is preferable since the initial crystallization can be facilitated without excessively raising the crystallization temperature. $3 \leq \chi$ is preferable since the crystallization can be attained at 100 nsec or less in high-speed crystallization or overwriting, and $\chi \leq 10$ is preferable from the viewpoint of extremely easy crystallization and preventing difficulty in recording. To realize the overwriting at a linear velocity of 10 m/s or more, it is preferred to perform the crystallization at 100 nsec or less.

The Sb quantity is preferably determined at $60 \leq \phi \leq 80$ from the viewpoint of increased repetition property.

The Te quantity is preferably determined at $\omega \leq 30$ to realize crystallization within 100 nsec, and also $15 \leq \omega$ from the viewpoint of increased repetition property.

Although the recording material consisting only of Sb and Te has excellent repetition property when the composition is an eutectic composition of $Sb_{70}Te_{30}$, however, there is a problem in that the storage property deteriorates because of the crystallization temperature of about 120° C., that the crystallization of the recording mark is caused to erase the mark in the long run.

In order to improve the storage property under room temperature, at least one element selected from Ge, B and C, which have large covalent bonding force to Te, is added. Consequently, the crystallization temperature can be raised to increase the activating energy of crystallization, and the storage property at about room temperature can be thus improved.

In order to realize the high-density recording, it is indispensable to attain a higher linear velocity, and requires overwriting at high speed and high-speed erasing (high-speed crystallization).

Since the high-speed crystallization develops around the melting point, addition of an element which reduces viscosity of the recording material at melting point is effective to realize a high-speed crystallization.

Thus, when an element (Al, Ga, Zn, Mn, Ta, Zr, Y, Mg, Ca, Br, or Cl) having ionicity to Te within the range of 5–28% was added to the Sb—Te recording material, satisfying result was obtained.

To describe in detail, it is known that the ionicity I to Te of the other element can be calculated according to the following equation:

$$I=1-\exp[-1/4(XTe-Xn)^2]$$

(where XTe is the electronegativity of Te, and Xn is the electronegativity of the other element).

The ratios of ionicity of the elements which demonstrated effect in realizing the high-speed crystallization against Te were calculated. The results are as follows: Al: 8.6, Ga: 6.0, Zn: 6.0, Mn: 8.6, Ta: 8.6, Y: 18.3, Mg: 18.3, Ca: 26.1, Br: 11.6, and Cl: 18.3 (numerical values are shown by %), and the ionicity thereof is within the range of 5–28%.

When an element deviating this range, for example, F having ionicity of 59.5% is added, the crystallization becomes extremely difficult, and the amorphous formation (recording) by laser becomes impossible.

When an element having an ionicity smaller than 5%, for example, Ag: 1.0%, Pt: 0.25%, or Ge: 2.2% is added, the crystallization rate is reduced.

Accordingly, Al, Ga, Zn, Mn, Ta, Zr, Y, Mg, Ca, Br, and Cl for instance, are preferred as the element D.

On the other hand, when the crystallization temperature of the recording layer at temperature rise rate of 10° C./min exceeds 240° C., initial crystallization becomes difficult, and therefore, 220° C. or less is preferred.

The film thickness of the recording layer of the third embodiment is determined at 10–100 nm, and preferably, 20–35 nm. When the thickness is smaller than 10 nm, optical adsorptivity is deteriorated and loses function as the recording layer, and when the thickness is larger than 100 nm, an interference effect cannot be expected because the light transmission is minimized.

For materials of the substrate, glass, ceramics and resin are generally used, and a resin substrate is preferable from the point of formability and cost. Examples of the resin include polycarbonate resin, acrylic resin, epoxy resin, polystyrene resin, silicone resin, fluorine resin, ABS resin, urethane resin and the like. The polycarbonate resin is preferable from the point of process ability, optical characteristics and the like. The substrate may have any of disk-like, card-like and sheet-like shapes, etc.

The protection layer is not necessarily provided on both sides of the recording layer. However, since it generally has also the function as heat resisting layer, at least a heat resisting lower protection layer is desirably provided when a substrate 1 is formed of a material having low heat resistance as polycarbonate resin.

The materials for the lower protection layer and the upper protection layer include metal oxides such as SiOx, ZnO, $SnO_2$, $Al_2O_3$, $TiO_2$, $In_2O_3$, MgO, $ZrO_2$, $Ta_2O_5$, etc; nitrides such as $Si_3N_4$, AlN, TiN, BN, ZrN, etc.; sulfides such as ZnS, $TaS_4$, etc.; and carbides such as SiC, TaC, $B_4C$, WC, TiC, ZrC, etc.

These materials may be used alone or as a mixture. Among them, a mixture of ZnS and $SiO_2$ is generally used in phase-change recording medium, and the mixing ratio is desirably determined at 80:20 (mole ratio).

For the lower protection layer, particularly, $ZnS.SiO_2$ (mole ratio 80:20) is preferably used, however it is not limited.

Since the lower protection layer also functions as heat resisting protection layer and optical interference layer, the film thickness is determined at 20–300 nm, and preferably 35–200 nm in order to fully bring out the functions. When the thickness is less than 20 nm, it invites deterioration in the environmental resistance protecting function, heat resistance, and heat accumulating effect, and the further deteriorates repetitive overwrite property. A thickness larger than 300 nm unpreferably leads to the flake off or crack of the film by the rise of film temperature in the film forming process by sputtering or the deterioration in sensitivity in recording.

Further, in the first embodiment of the present invention, the film thickness range is determined at 45–250 nm, and preferably 65–200 nm. The reason for determining the upper limit and lower limit is the same as described above.

The upper protection layer plays an important role in the thermal control in recording and erasing.

In order to heat the recording layer to near melting point, heat accumulation can be much easily performed when the heat conductivity of the upper protection layer is lower, and the temperature of the recording layer can be raised in a short time. The heat accumulation is necessary not only in the formation of the recording mark but also in the erasing of the mark to melt the recording layer and develop crystals. In this case, the accumulated heat of the upper protection layer must be immediately released after the completion of recording and erasing. Therefore, the reflection layer has the role of not only reflecting light but also releasing the heat.

A preferable upper protection layer has a low heat conductivity and small specific heat, does not crystallize by overwriting, and free from generation of crack or diffusion of element under extensive heating and quenching operation. Although $ZnS.SiO_2$ (mole ratio 80:20) satisfies these conditions, the higher linear velocity requires the heating and quenching in a shorter time, and thus requires consideration of more appropriate materials. Further, in order to raise the sensitivity, it is necessary to improve the thermal shock resistance and suppression of cracking against short-time repetitive heating and quenching at the time of overwriting with a lower heat conductivity.

$ZrO_2$ has a refractive index of 2.0 or more, which is substantially equal to or larger than $ZnS.SiO_2$ (mole ratio 80:20). When it is formed into a thin film, sputtering is performed by use of a target material. In the production of a crystal of bulk, as is well known, $Y_2O_3$ is added to $ZrO_2$ as a sintering assistant to stabilize it. The quantity thereof is set to 2–10 mol %, preferably, 3–6 mol %.

The heat conductivity (at room temperature) in bulk state was measured for $ZrO_2.Y_2O_3$ (mole ratio 97:3), $ZrO_2.SiO_2$ (mole ratio 95:5), $ZnS.ZrO_2$ (mole ratio 80:20), $ZrO_2.TiO_2$ (mole ratio 50:50), and $ZnS.SiO_2$ (mole ratio 80:20). The results were 5.1, 3.48, 12.1, 1.73, and 8.4 (W/mK) in that order. The refractive index (n) was 2 or more in all compositions except $ZrO_2.SiO_2$ (mole ratio 95:5). Among them, $ZnS.ZrO_2$ (mole ratio 80:20) had the highest value of 2.3. For the attenuation constant (k), $ZnS.SiO_2$ (mole ratio 80:20) has the smallest value of substantially 0, and those of systems containing $ZrO_2$ are higher than that.

The result of the optical constant is the result at a wavelength of 660 nm. Accordingly, the optical absorption is increased, causing a reduction in reflection ratio when the film thickness is determined too large in thinning, except $ZnS.SiO_2$ (mole ratio 80:20).

Medium was produced by using these upper protection layers, and examined for the storage property of recording mark at 80° C. and 85% RH after recording. Consequently, the mark was erased in case of $ZrO_2.Y_2O_3$ (mole ratio 97:3). However, the repetitive overwrite property of $ZrO_2$-based ones is satisfying, and the jitter deterioration after 1000 recordings was less than in $ZnS.SiO_2$ (mole ratio 80:20).

Examinations showed that more satisfying storage property, repetitive overwrite property and sensitivity than in $ZnS.SiO_2$ (mole ratio 80:20) alone can be obtained by adding $ZrO_2.Y_2O_3$ to $ZnS.SiO_2$.

A preferable mixing ratio is $SiO_2$:5–50 mol % to $ZrO_2$: 5–50 mol %. For example, $ZnS:ZrO_2:Y_2O_3:SiO_2$= 72:10:3:15 (mol %) had a refractive index of 2.1, a heat conductivity of 5 W/mK, and an attenuation coefficient of approximately $10^{-5}$. The repetitive overwrite property was also better than that of $ZnS.SiO_2$ (mole ratio 80:20), and the data storage property under high-temperature, high-humidity environment was also improved.

The upper protection layer is also formed by sputtering and the like.

The film thickness of the upper protection layer is determined at 5–50 nm, and preferably, 8–20 nm. When the thickness is less than 5 nm, the recording sensitivity or heat resistance deteriorates, and when the thickness is greater than 50 nm, the repetitive overwrite property deteriorates due to deformation by the rising temperature and deterioration of heat releasing property.

Further, in the second embodiment of the present invention, the film thickness is determined at 10–50 nm. The reason for determining the upper limit and the lower limit is the same as described above.

For the reflection layer, metallic materials such as Al, Ag, Cu, Pd, Cr, Ti and the like are used. The reflection layer generally also performs function of heat releasing layer. The film thickness is determined at 50–300 nm, and preferably, 70–200 nm. When the film thickness is too large, radiating property is improved, but the substrate is deformed by the temperature rise of the medium during the thin film formation.

Since the thickness of the substrate in DVD is 0.6 mm which is half the thickness of CD, the deformation tends to be greater. Although Al or Al alloy was used conventionally for the reflection layer, the characteristic has been improved at the two-fold velocity of DVD by use of Ag having higher heat conductivity.

Namely, when the linear velocity is increased, the cooling rate also increases, however extension in the heating pulse time of the emitting pulse is required at the time of formation of the mark, because the reference clock is minimized and causing insufficient heating. Such phenomenon may be obviated by increasing the power, but the power has a limit. When the heating time is extended, the cooling time is shortened to cause an insufficiency of the cooling time, which makes the formation of mark difficult, because the reference clock is defined by the sum of one heating pulse time and one cooling pulse time, hence these times may be changed within the limit.

In order to solve this problem, Ag capable of increasing the cooling efficiency should be used. However, when the upper protection layer contains sulfur (S), and the reflection layer is formed of Ag, $Ag_2S$ tends to be formed under high temperature and high humidity, and this causes deterioration of property and generation of defects. Therefore, it is necessary to provide the upper second protection layer 4A between the reflection layer and the upper protection layer as shown in FIG. 2.

As result of earnest studies for oxides, nitrides, carbides and metals as the materials for the upper second protection layer, the present inventors found that Si, SiC, $ZrO_2.Y_2O_3$, MgO, and TiOx are preferable. Among them, Si, SiC and materials containing these for main components thereof have high adhesion with Ag, with particular preference to Si. The main component means that it occupies 99 wt % or more of the whole material. However, since these materials are highly light absorptive and deteriorate the reflection ratio, the film thickness cannot be increased too much.

On the other hand, since oxides such as $ZrO_2.Y_2O_3$, MgO and TiOx and the like hardly cause flake off of film by the stress of the film because the thermal expansion coefficients with Ag are small, or hardly reduce the reflection ratio because they are highly adhesive and transparent. Therefore, the above oxides and materials containing these for main components thereof are particularly suitable. The main component means that it occupies 99 wt % or more of the whole oxide.

The film thickness of the upper second protection layer is determined at 2–10 nm. When the thickness is smaller than 2 nm, the formation of $Ag_2S$ is difficult to suppress, and the storage property may deteriorate. When the thickness exceeds 10 nm, the radiation efficiency deteriorates due to increase in the distance with the reflection layer.

Although it was described above that characteristics can be improved by using Ag in the reflection layer, even Ag single body can be used without causing any practical problem, if corrosion resistance of Ag itself or the adhesion with the upper protection layer is taken into consideration, and as long as sputtering condition in the thin film formation is optimized, and hardening condition and thickness of an acrylic ultraviolet ray curable resin used on the reflection layer as an environmental protection layer are optimized.

However, there is a fear of deterioration if it is not formed under optimum conditions, or depending on the storage condition before adhering a substrate having no recording film as DVD, the moisture adsorptivity of the substrate itself, and the moisture adsorptivity of the ultraviolet ray curable resin.

Therefore, an alloy comprising 95 atomic percentage or more of Ag and as the remainder by Cu and Ni: AgxCuyNi100–x–y (x and y express atomic percentage, $x \leq 95$, $0 < y \leq 5$, and 100–x–y>0) is used, whereby the reliability can be improved. The ratio of Cu to Ni is desirably determined at Cu>Ni.

When the adding quantity of Cu and Ni with respect to Ag exceeds 5 atomic percentage, the heat conductivity remarkably deteriorates. Therefore, the adding quantity is particularly preferable by 2 atomic percentage or less.

The phase-change recording medium of the structure described above is recordable and reproducible within the recording wavelength range of 400–780 nm.

For instance, in DVD, the thickness of the substrate is determined at 0.6 mm to minimize the aberration in order to cope with a laser beam wavelength of 650 nm, an aperture ratio of objective lens of 0.60–0.65, and a beam diameter of an incident light of 1 $\mu$m or less.

The pitch between channel parts for writing the mark is determined at 0.74 $\mu$m, the channel depth at 15–45 nm, and the channel width at 0.2–0.3 $\mu$m. The channel has a form of meander having a period of about 820 kHz. An address portion reverses the phase, detects the phase change, and converts the result into a binarized signal to read the address (number). The amplitude of the meander is 5–20 nm. The recording is performed by (8–16) modulation method at a recording linear density of 0.267 $\mu$m/bit. The shortest mark length is 0.4 $\mu$m.

In the two-fold velocity of DVD, the linear velocity is 7 m/s (6.98 m/s), and the reference clock frequency is 52.3 MHz (T: 19.1 nsec).

In the five-fold velocity, the linear velocity is 17.5 m/s, and the reference clock frequency is 130.8 MHz (T: 7.65 nsec).

When compared at the same recording density, the higher the linear velocity becomes, the shorter the reference clock becomes. However, since the rising and falling times of the pulse of the LD used for oscillating a wavelength of 650 nm are about 2 nsec, the reference clock becomes close to the rising and falling times of the pulse in high linear velocity. Therefore, not only the time for heating and cooling the recording layer is shortened, but also causes shortening of the times for effective heating and cooling when the time required for the rise and falling of the pulse is considered. Consequently, not only the recording mark cannot be formed to a prescribed length, but also the area of the mark is reduced, and sufficient signal characteristic may not be obtained.

As a countermeasure to cope with such phenomenon, for example, it is conceivable to increase the recording power to compensate the shortened heating time, but the power is limited.

In terms of requirement to increase the radiation efficiency in the medium to compensate for the shortened cooling time, consequently causes deterioration in the sensitivity, and not easy to find materials having higher heat conductivity.

Accordingly, to further improve the recording property, it is necessary to consider a new recording method.

Figure 4:
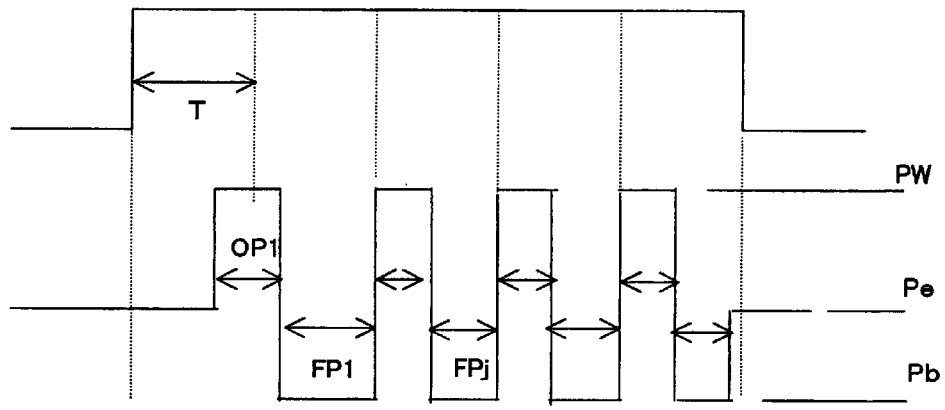
FIG. 4 is a view showing the pulse waveform of an emitting pulse used in a conventional recording method.

The pulse waveform of an emitting pulse used in a conventional recording method is shown in FIG. 4.

The heating pulse time and the cooling pulse time are adjusted so that the sum of a heating pulse time part OPi (i=1−m) for irradiating a recording power Pw to heat and a cooling pulse time part FPi (i=1−m) laid in a power state lower than an erasing power Pe and a reproducing power Pr is basically T, are determined as optimum conditions.

The number of pulses in a case of recording mark length of 5T is as shown in FIG. 4. The number of pulses m is (n−1) for each mark length, but in some cases (n−2).

The start position of first heating pulse is adjusted so that a prescribed mark length can be obtained, and the mark end part is also adjusted so that the amorphous phase is recordable up to the boundary of the channels. Accordingly, the sum of the first heating pulse time and the cooling pulse time often exceeds T. The intermediate and the last heating pulses have the same start position.

At a linear velocity of 17.5 m/s, when the reference clock is approximately 7.5 nsec, each of the heating and cooling times in recording a mark having a length 1T, for instance is determined at 0.5T each, to bring the total to 4 nsec or less, since the heating and cooling must be controlled within the above time.

The recording layer is not sufficiently heated within the time from emission start to emission end since the rising time of the pulse is 1.5–2 nsec, and the heating is limited to the center part of the channel even if heated, resulting in a slender mark with small mark area.

The same applies for the cooling pulse time. When a sufficient time cannot be taken, the mark cannot be recorded, and the formation of the mark of a prescribed length becomes difficult to form.

Accordingly, although it does not mean that the recording cannot be performed by the conventional method, the recording is impossible at a linear velocity of 20 m/s or more, or the margin of time is hardly left even if the recording is possible, and hence not practically usable.

It is apparent that the formation of the recording mark in high-density, high-linear velocity recording is difficult because of such problems, and as a method for solving them, the following means is disclosed in Japanese Patent Application Laid-Open No. 9-134525.

The sum of heating pulse and cooling pulse is determined longer than 1T, the number of pulses is reduced, further, 3T mark is eliminated and defines widths of an intermediate and a last heating pulse times and cooling pulse times thereof respectively for an even number length and an odd number length. Namely, in an odd number mark, the number of pulses of 3T is one, and a pulse comprising heating pulse and cooling pulse of 1T each which makes up the sum of 2T is increased for every extension of the mark length by 2T for instance, n=5, 7, 9, and onwards. On the other hand, for an even number mark, the number of pulses of 4T mark is 2, and the same pulse as in the odd number mark is increased one by one for every extension of the mark length by 2T.

In this method, however, the pulse time is limited, and the high linear velocity in case of DVD having a density much higher than CD is not sufficiently examined.

Therefore, a recording method which enables excellent recording performance was studied in the present invention.

Figure 5:
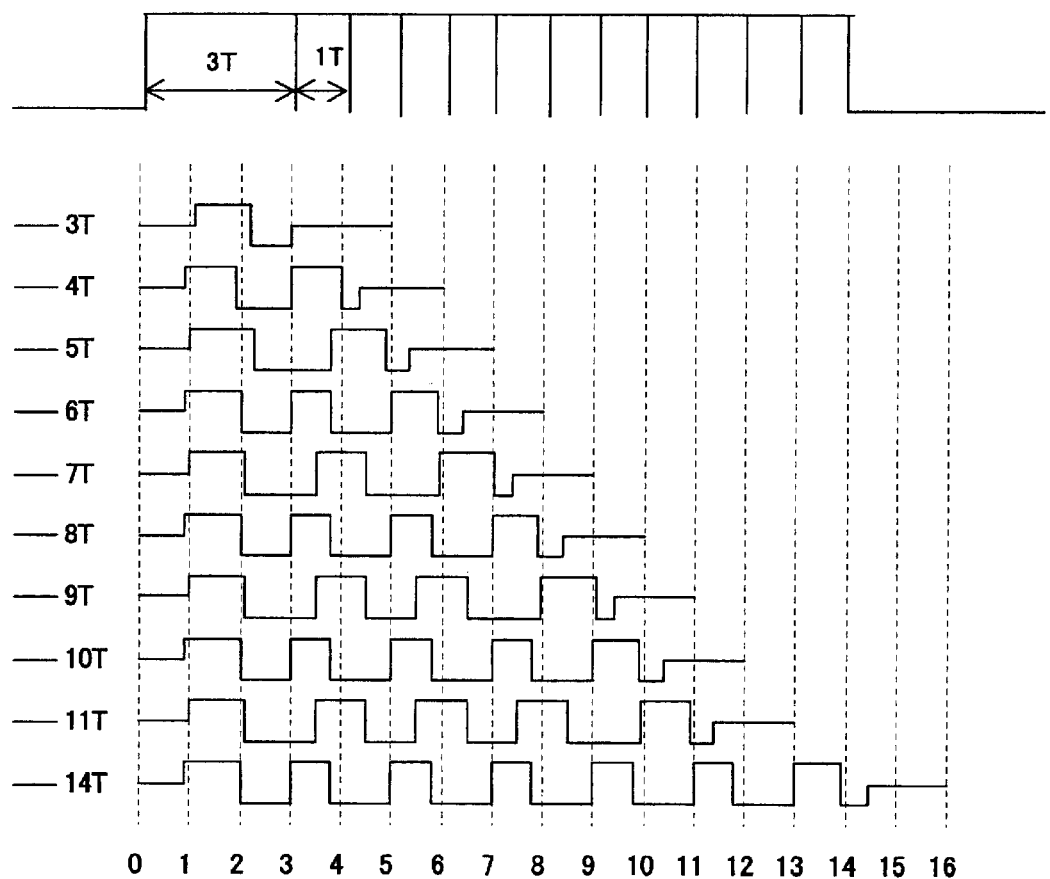
FIG. 5 is a view showing a recording waveform of the present invention at the 5-fold velocity of the DVD.

The recording waveform of the present invention in the 5-fold velocity of DVD is shown in FIG. 5.

This figure shows pulse emission waveforms for every mark length to record mark lengths of 3T to 14T, wherein the numerical value of the horizontal axis is a coefficient multiplied to the reference clock T, and it represents a time of 0T-16T.

In 3T of the figure, the number of pulses is 1, and it is formed of only the first heating pulse and the last cooling pulse. In the recording mark lengths nT, the number of pulses is m=L in n=2L (L is an integer of 2 or more), and the number of pulses is m=L in n=2L+1 (L is an integer of 2 or more). However, in terms of the number of pulses, 5T may have 3.

The last cooling pulse time for 4T and 7T marks are determined at 2.7 nsec, and preferably 2.5 nsec or more. When the time determined is shorter than this, the cooling time becomes too short to adjust the length of the rear end of the mark.

The start position of the first pulse is preferably basically determined, on the basis of the front (head) position of the recording mark to be actually recorded, with a delay of 1T therefrom. Other means may be adapted to more accurately control the mark length and mark head part.

The first pulse heating time OP1 is preferably determined within the range of 0.5T<OP1<2.0T, and the first pulse cooling time FP1 within the range of 0.5T<FP1<2.0T.

The intermediate heating pulse time OPj and the cooling pulse time FPj are preferably determined within the ranges of 0.5T<OPj<1.5T and 0.5T<FPj<1.5T, respectively.

The last heating pulse time OPm is preferably determined within the range of 0.4T<OPm<1.5T, and more preferably $0.5T \leq OPm \leq 1.2T$. The last cooling pulse time FPm is determined to 0.32T or more or 2.5 nsec or more.

Figure 6:
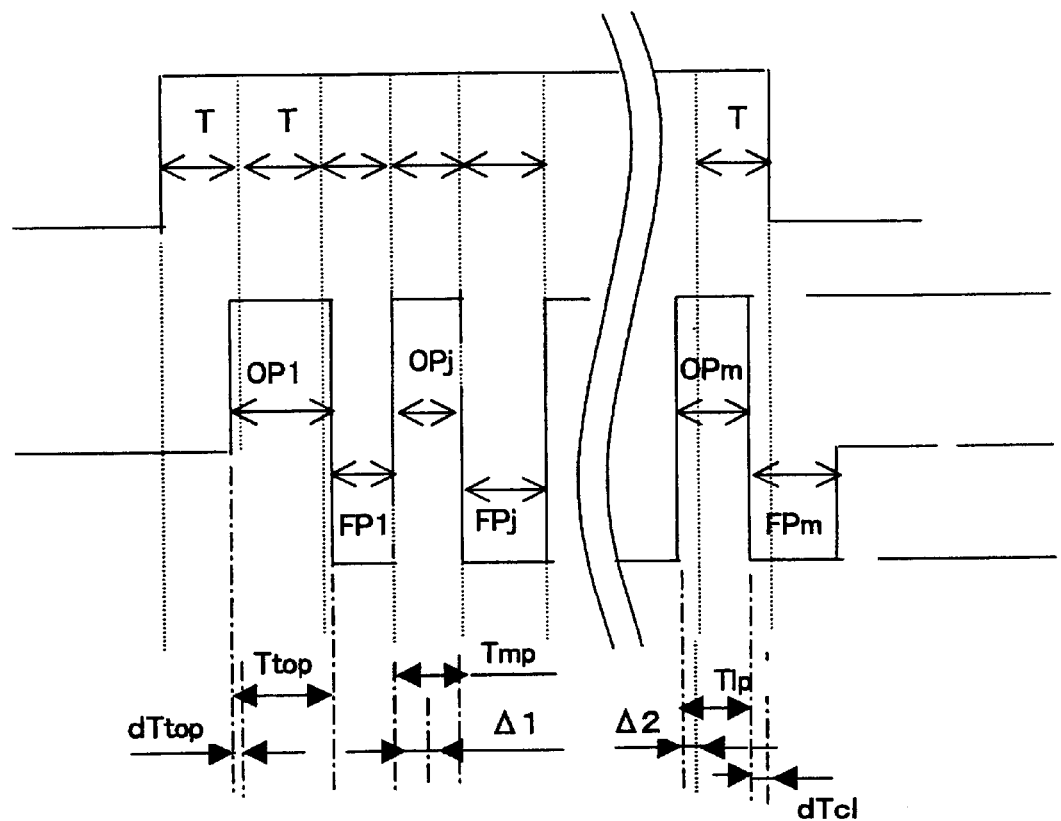
FIG. 6 is a view showing each pulse according to the present invention.

Within the ranges of these conditions, each pulse shown in FIG. 6 is controlled with the sum of a time proportional to the reference clock and a time proportional to a fixed time, or solely by the time proportional to the reference clock. This method is conformable also to CLV method having a linear velocity changed according to radial position, and can perform a recording at every linear velocity without impairing properties even when the reference clock is continuously changed.

The start position of the first heating pulse is determined at a position with a delay of 1T, the change time from this reference position is defined as dTtop, the width of the first heating pulse time is defined as Ttop, the start position of the intermediate heating pulse is determined at a position with a delay of 3T, and the width of the pulse time thereof is defined as Tmp. For mark lengths on and after 6T, the start position is delayed by Δ1 when the recording mark length n is n=2L+1 (L is an integer of 3 or more). This Δ1 is basically determined at 0.5T. However when n=2L, Δ1 is 0T, but not limited as such.

The start position of the last heating pulse is determined at a position 1T ahead of the reference mark length. To record a mark with a prescribed length, this part may be changed. This is defined as Δ2. Δ2 is preferably −0.5T<Δ2<0.5T.

The width of the last heating pulse time is defined as Tc1. This time is preferably 0.5T<Tc1<1.5T.

The last cooling pulse time is defined as dTc1 on the basis of the rear end of the reference mark length. The preferable width is −1.0T<dTc1<1.0T.

In such a recording method, a recording power Pw which is a power of LD emitted during the heating pulse time and a bottom power Pb which is a power emitted during the cooling pulse time are made constant in all pulses. However, only the first pulse may be determined higher than the pulses of other parts.

In recording at wide range of linear velocities from low linear velocity to high linear velocity, a power lower than an erasing power Pe and further lower than the reproducing power Pr is emitted as the bottom power Pb, but it may be changed according to linear velocity. Since the cooling rate increases according to an increase in linear velocity, the rear end length of the recording mark often becomes larger than the prescribed length in some media. Particularly, it is effective to determine higher value of the Pb emitted in the last cooling pulse time within the range of the reproducing power Pr or less (Pb≦Pr).

Even if the linear velocity is increased, the recording of the recording mark in a prescribed length can be attained by the above method. There is no problem in recording for the first time after initialization, however, the mark is more easily left unerased at a higher linear velocity when overwriting, because the rise time of pulse from Pb to Pe in the rear part is shorter (2 nsec in average) as the linear velocity becomes higher, and when Pe is low, the temperature necessary for erasing cannot be reached. To erase the mark at a low temperature, the heating state must be kept long, but a sufficient time cannot be ensured. It is conceivable to raise Pe. However, when Pe is raised too high, the erasing error can be eliminated, on the other hand, the recorded mark is recrystallized and erases the necessary mark.

Figure 7:
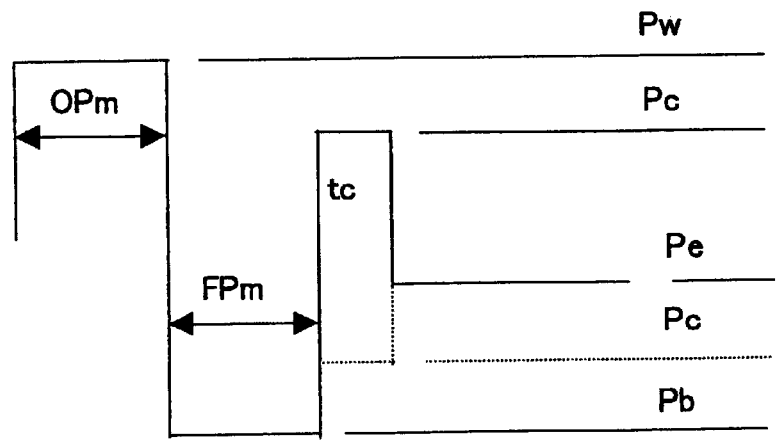
FIG. 7 is a view illustrating the state of emitting a correction power Pc to the hindmost part of the emitting pulse.

To deal with this problem, as shown in FIG. 7, a correction power Pc (Pe>Pc>Pb) which is higher than Pb but lower than Pe is emitted to the hindmost part of the emitting pulse. The emitting time tc is preferably determined at 1T or less. By using this method, the length of the mark at rear end part can be controlled at a higher linear velocity, and even if the erasing power is increased, the remaining mark can be erased.

When Pc is set higher than Pe (Pe<Pc), the heating can be effectively performed in a short time after recording the mark, and this is effective to a recording layer having a slow crystallization rate. The emitting time of the correction power is preferably determined at 1T or less. When it is longer than 1T, the recording mark is erased more than it is required, or the head of the recording mark which follows is erased when the space between the marks is allocated too narrow.

The above examination was performed under conditions of Pw≦22 mW, Pe≦15 mW, Pb≦Pr, and Pr<1 mW.

EXAMPLES

The present invention will be concretely described below using Examples and Comparative Examples, but the present invention should not be construed as limited by these examples.

Examples 1–15

Using polycarbonate substrate having a channel pitch of 0.74 μm, a channel width of 2.5 μm, a channel depth of 25 nm, and a thickness of 0.6 mm, recording medium was produced by laminating each layer thereon by sputtering.

A lower protection layer 68 nm in film thickness was formed first by use of a target of $ZnS:SiO_2=80:20$ (mol %).

Each phase-change recording layer 16 nm in film thickness was then formed by use of alloy targets corresponding to the compositions shown in the columns of recording layer of Examples 1–15 of Table 1. The basic composition of such recording layer is any one of GeMnSbTe, GeGaMnSbTe, and GeSnMnSbTe.

Then, each upper protection layer 10 nm in film thickness was formed using the same target of $ZnS:SiO_2=80:20$ (mol %) as in the lower protection layer (Examples 1–12).

Further, medium provided with an upper protection layer 10 nm in film thickness was separately formed using mixture target of $ZnS:ZrO_2:Y_2O_3:SiO_2=62:20:3:15$ (Examples 13–15).

Each second upper protection layer 4 nm in film thickness having compositions shown in Table 1 was then formed.

Each reflection layer 140 nm in film thickness formed of Ag or AgCuNi alloy shown in Table 1 was formed.

In order to improve the environmental resistance, further, a protection film 5 μm in film thickness was formed by applying an ultraviolet ray curable resin SD318 manufactured by DAINIPPON INK AND CHEMICALS, INCORPORATED followed by hardening.

Finally, the same polycarbonate substrate having no laminated film was caused to adhere thereto with an ultraviolet ray curable resin (made of acrylic resin, NIPPON KAYAKU CO.,LTD., DVD003) 40 μm in thickness to provide recording medium.

Thereafter, the recording layer was crystallized by using a large aperture LD (1 μm in track direction×196 μm in radial direction) at a linear velocity of 3.5 m/s, a power of 850 mW, and a head feeding speed of 36 μm/r. A pickup head with wavelength 657 nm and objective lens NA 0.65 was used for recording and reproducing so that the recording density becomes 0.267 μm/bit at a linear velocity of 17.5 m/s. Recording data were recorded by (8–16) modulation at a recording power of 19 mW, a bias power of 0.1 mW, and an erasing power of 6 mW.

The recording was performed using a conventional pulse waveform as shown in FIG. 4. The number of pulses of each mark length was defined as (n−1). For each time shown in FIG. 4, a specific rate was defined as follows. OP1=4 nsec, FP1=4.3 sec, OPj, OPm=3.5 nsec, FPj=4.1 nsec, and OPm=4.5 nsec. T was 7.6 nsec.

The data-to-clock (d atom atom o clock) jitter value after 1000 DOW (direct overwrite frequency) recordings on five adjacent tracks is shown in Table 1. The jitter (σ/T) of one recording was 7–8%.

The jitter rise value (%) in leaving under high-temperature, high-humidity environment at 80° C. and 85%

RH for 300 hrs after 10 recordings and the defective ratio after repeating the cycle of retaining at 25° C. and 95% RH for 6 hrs and further retaining at 40° C. and 95% RH for 6 hrs 6 times were examined. The results are shown in Table 1, wherein, as the evaluation criteria for defective ratio, a defective ratio of $10^{-5}$ or less is shown as "○", and the ones exceeding this value or the presence of a visually confirmable defective is shown as "x".

Comparative Examples 1–3

Recording medium was formed in the same manner as in Example 1 except that the recording layer was changed to AgInSbTe, AlTi (Comparative Examples 1 and 2) as the reflection layer was used, and providing no second upper protection layer.

The data-to-clock jitter value examined in the same condition as in Example 1 is shown in Table 1. The jitter (σ/T) of one recording was 9% in Comparative Examples 1 and 2, and 8% in Comparative Example 3.

The jitter rise value (%) measured in the same condition as in Example 1, and the defective ratio examined in the same condition and evaluated on the basis of the same criteria are also shown in Table 1. The jitter was significantly raised in Comparative Examples 1 and 2, compared with Examples 1–15, and the evaluation of defective ratio was "x" in Comparative Example 3.

Example 16

The recording medium having the layer structure of Example 4 was subjected to recording by a method shown in FIG. 5.

Each parameter shown in FIG. 6 is as follows:
dTtop=±0.1T×n';
Ttop=(T/12)×n'+0.5×m';
Tmp=(T/12)×n'+0.5×m';
T1p=(T/12)×n'+0.5×m'; and
dTc1=0.05T×n'

Values of n and m in each parameter are shown in Table 2.

Figure 8:
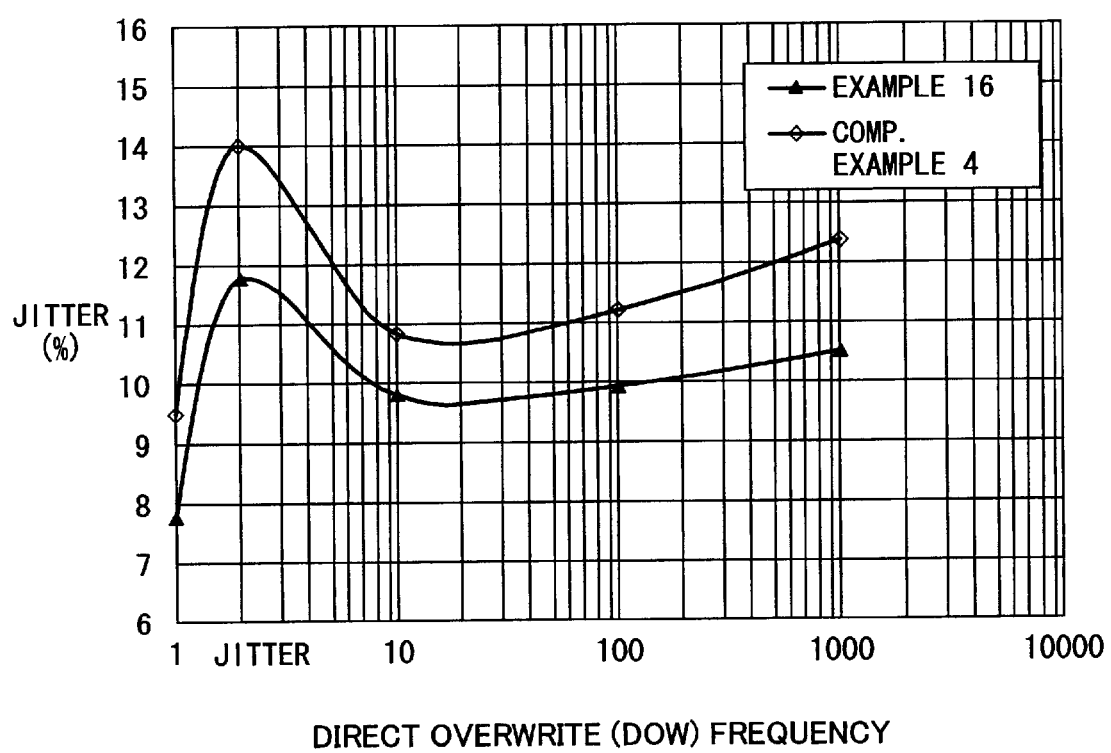
FIG. 8 is a view showing the DOW frequency dependency of jitter.

The DOW frequency dependency of jitter according to this example is shown in FIG. 8.

In this case, also, the recording was continuously performed on five adjacent tracks. The ratio of erasing power Pe to recording power Pw was determined at Pe/Pw=0.36. The recording power was determined at 18 mW.

After 1000 DOWs, the jitter was 10.5%, and the modulation factor was 72%. The bottom power Pb was determined at 0.1 mW.

Comparative Example 4

The recording medium of Comparative Example 1 was subjected to recording in the same condition as in Example 16. The modulation factor was 63%, which was lower than in Example 16, and the jitter was also higher by 2% than in Example 16.

The DOW frequency dependency of jitter of this comparative example was shown in FIG. 8.

Example 17

Figure 9:
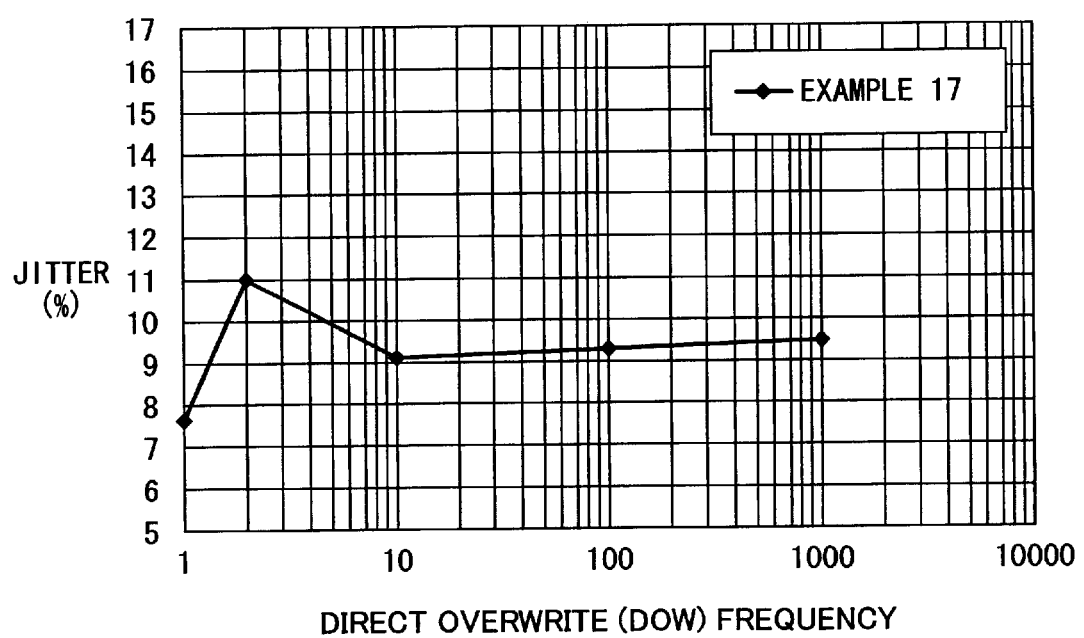
FIG. 9 is a view showing the result of jitter of Example 17.

The recording was performed in the same manner as in Example 16 except determining the bottom power Pb at 0.7 mW, which is the same rate as the reproducing power Pr. The result is shown in FIG. 9. The jitter was improved by about 1% irrelevant to recording frequency.

Example 18

The recording was performed using the same recording media as in Examples 16 and 17 under the same condition.

When a correction pulse as shown in FIG. 7 was determined at Pc=8 mw, tc=0.7t for an odd number length and Pc=8 mW and tc=0.5T for an even number length, the jitter was improved by about 1% compared to Example 17 irrelevant to recording frequency, and became 9% or less.

TABLE 1

| | Recording Layer (atomic %) | | | | | Upper Protection Layer | Second Upper Protection Layer | Reflection Layer (atomic %) | DOW 1000 | High-Temperature, High-Humidity Environmental Test | Heat Cycle |
|---|---|---|---|---|---|---|---|---|---|---|---|
| | Ge | Mn | Sb | Te | X: Adding quantity (mol %) | | | | | | |
| Example 1 | 5 | 5 | 72 | 18 | None | ZnS:SiO$_2$ = 80:20 | Si | Ag | 11.2 | 0.8% | ○ |
| Example 2 | 5 | 5 | 72 | 18 | None | ZnS:SiO$_2$ = 80:20 | SiC | Ag95Cu1.5Ni0.5 | 11.5 | 0.7% | ○ |
| Example 3 | 5 | 5 | 72 | 18 | None | ZnS:SiO$_2$ = 80:20 | MgO | Ag95Cu1.5Ni0.5 | 11.5 | 1.0% | ○ |
| Example 4 | 3 | 4 | 70.5 | 19.5 | Ga:3 | ZnS:SiO$_2$ = 80:20 | Si | Ag | 10.9 | 0.7% | ○ |
| Example 5 | 3 | 4 | 70.5 | 19.5 | Ga:3 | ZnS:SiO$_2$ = 80:20 | SiC | Ag95Cu1.5Ni0.5 | 10.8 | 0.7% | ○ |
| Example 6 | 3 | 4 | 70.5 | 19.5 | Ga:3 | ZnS:SiO$_2$ = 80:20 | TiO$_x$ | Ag95Cu1.5Ni0.5 | 11 | 1.0% | ○ |
| Example 7 | 5 | 6 | 69 | 18 | Ga:2 | ZnS:SiO$_2$ = 80:20 | Si | Ag | 11.8 | 0.5% | ○ |
| Example 8 | 5 | 6 | 69 | 18 | Ga:2 | ZnS:SiO$_2$ = 80:20 | SiC | Ag95Cu1.5Ni0.5 | 12.1 | 0.5% | ○ |
| Example 9 | 5 | 6 | 69 | 18 | Ga:2 | ZnS:SiO$_2$ = 80:20 | ZrO$_2$ | Ag95Cu1.5Ni0.5 | 11.9 | 0.8% | ○ |
| Example 10 | 5 | 5 | 70 | 18 | Sn:2 | ZnS:SiO$_2$ = 80:20 | Si | Ag | 12.2 | 0.9% | ○ |
| Example 11 | 5 | 5 | 70 | 18 | Sn:2 | ZnS:SiO$_2$ = 80:20 | SiC | Ag95Cu1.5Ni0.5 | 12.3 | 0.9% | ○ |
| Example 12 | 5 | 5 | 70 | 18 | Sn:2 | ZnS:SiO$_2$ = 80:20 | MgO | Ag95Cu1.5Ni0.5 | 12.5 | 1.1% | ○ |
| Example 13 | 4 | 7 | 70 | 19 | None | ZnS:ZrO$_2$:Y$_2$O$_3$:SiO$_2$ = 62:20:3:15 | Si | Ag | 10.5 | 1.0% | ○ |
| Example 14 | 4 | 7 | 70 | 19 | None | ZnS:ZrO$_2$:Y$_2$O$_3$:SiO$_2$ = 62:20:3:15 | SiC | Ag | 10.5 | 1.1% | ○ |
| Example 15 | 4 | 7 | 70 | 19 | None | ZnS:ZrO$_2$:Y$_2$O$_3$:SiO$_2$ = 62:20:3:15 | MgO | Ag | 10.5 | 1.3% | ○ |

TABLE 1-continued

| | Recording Layer (atomic %) | | | | X: Adding quantity (mol %) | Upper Protection Layer | Second Upper Protection Layer | Reflection Layer (atomic %) | DOW 1000 | High-Temperature, High-Humidity Environmental Test | Heat Cycle |
|---|---|---|---|---|---|---|---|---|---|---|---|
| | Ge | Mn | Sb | Te | | | | | | | |
| Comp. Ex. 1 | Ag:In:Sb:Te = 1:6:77:16 | | | | | $ZnS:SiO_2$ = 80:20 | None | AlTi | 15 | 2.5% | ○ |
| Comp. Ex. 2 | Ag:In:Sb:Te = 2:7:80:11 | | | | | $ZnS:SiO_2$ = 80:20 | None | AlTi | 15 | 4.0% | ○ |
| Comp. Ex. 3 | Ag:In:Sb:Te = 1:6:77:16 | | | | | $ZnS:SiO_2$ = 80:20 | None | Ag | 14 | 5.0% | × |

TABLE 2

| Mark Length | dTtop | Top | | Tmp | | T1p | | dTcl |
|---|---|---|---|---|---|---|---|---|
| | n' | n' | m' | n' | m' | n' | m' | n' |
| 3 | 1 | 12 | 2 | | | | | 0 |
| 4 | −1 | | 1 | | | 10 | 3 | 7 |
| 5 | 0 | | 3 | | | 10 | 4 | 7 |
| 6 | −1 | | 1 | 10 | 1 | 10 | 1 | 8 |
| 7 | 0 | | 1 | 10 | 3 | 10 | 4 | 8 |
| 8 | −1 | | 2 | 10 | 1 | 10 | 1 | 8 |
| 9 | 0 | | 1 | 10 | 3 | 10 | 4 | 8 |
| 10 | −1 | | 2 | 10 | 1 | 10 | 1 | 8 |
| 11 | 0 | | 1 | 10 | 3 | 10 | 3 | 8 |
| 14 | −1 | | 4 | 10 | 1 | 10 | 1 | 9 |

Examples 19–26 and Comparative Examples 5–8

A polycarbonate substrate having a track pitch of 0.74 μm, a channel depth of 40 nm, a thickness of 0.6 mm, and a diameter of 120 mm φ was dehydrated at high temperature, and a lower protection layer, a recording layer, an upper protection layer, an upper second protection layer and a reflection layer were successively formed thereon by sputtering (FIG. 2).

The lower protection layer was formed in a thickness of 70 nm by use of a $ZnS—SiO_2$ target.

For the recording layer, an alloy target obtained comprised of prescribed composition ratio, pulverized and sintered was used, and the recording layer was formed in a thickness of 18 nm by sputtering at argon gas pressure of $3×10^{-3}$ Torr and RF power of 300 mW.

The upper protection layer was formed in a thickness of 15 nm by use of a $ZnS—SiO_2$ target.

The upper second protection layer was formed in a thickness of 4 nm by use of a SiC target.

The reflection layer was formed in a thickness of 140 nm by use of an Ag alloy target.

Further, an organic protection film formed of an acrylic ultraviolet ray curable resin was applied onto the reflection layer in a thickness of 5–10 μm by a spinner, and then hardened with ultraviolet ray.

A polycarbonate disk 12 cm in diameter and 0.6 mm in thickness was further caused to adhere to this surface intervening an adhesive sheet, and the recording layer was initially crystallized by irradiation with wide aperture laser to form optical recording media.

By use of these samples, the recording layer was structurally analyzed by electron beam diffraction method. A sample of the recording layer single film was separately formed and structurally analyzed by X-ray diffraction method.

A pickup with wavelength 656 nm and NA 0.65 was used for the signal characteristic evaluation of the optical recording media. Pulse modulation method was used for recording, and recording data were recorded by EFM+modulation method at a recording density of 0.267 μm/bit, and an optimum linear rotation rate and at optimum recording power according to each recording layer. The recording strategy was also optimized so as to minimize the jitter. Reproducing was performed at a power of 0.7 mW and a linear velocity of 3.5 m/s to measure GDWD WR FORFN jitter (the value obtained by standardizing σ by a detection window width Tw is referred as jitter herein).

The recording layer compositions used in Examples 19–26 and Comparative Examples 5–8 are shown in Table 3, and the crystal structure, recordable highest linear rotation rate, repeated recording frequency, crystallization temperature, archival increasing ratio, initial crystallization, and melting point are shown in Table 4.

The crystal structure of the recording layer was structurally analyzed by X-ray diffraction method and electron beam diffraction method. The "distorted NaCl-type structure" means a structure having turbulences allowing entrance of every atom constituting the recording layer in Na-site and Cl-site, so that the NaCl-type structure is distorted.

The recordable highest linear rotation rate means that the highest linear rotation rate allowing the recording at a jitter of 10% or less with a recording strategy and recording power optimized in every example. In each case, satisfying recording can be performed even at a linear velocity at the recordable highest linear rotation rate or less by controlling the recording strategy.

The repetitive recording frequency refers to repetitive recording frequency where the jitter after overwrite is 12% or less.

The archival is shown as the increase ratio to initial value of σ after storage at 80° C. for 300 hrs.

For the initial crystallization, "○" was given when the reflection ratio after initial crystallization is uniform in plane, and "difficult" was entered when the reflection ratio showed distribution.

The crystallization temperature at a temperature increasing rate of 10° C./min was measured by use of a differential scanning calorimetric device.

The melting point was measured by use of a differential thermal and thermogravimetric simultaneous measuring instrument.

In Examples 19–26, the recording layer composition was designed so as to have a linear rotation rates of 17/s, a melting point of 530–560° C., and a crystallization temperature of 150–200° C. to form a single film and medium.

As result of evaluation for physical properties of recording layer, it was confirmed that all the recording layers have locally distorted crystal structures in Examples 19–26, and their crystallization temperatures and melting points fulfilled desired values.

Further, as a result of evaluation for medium properties, the reflection rate after initial crystallization was uniform in plane, the highest recordable rotation rate was 17 m/s or more, the repetitive recording frequency was 5000 or more, and the archival increasing rate was suppressed within 1.5%.

Figure 10:
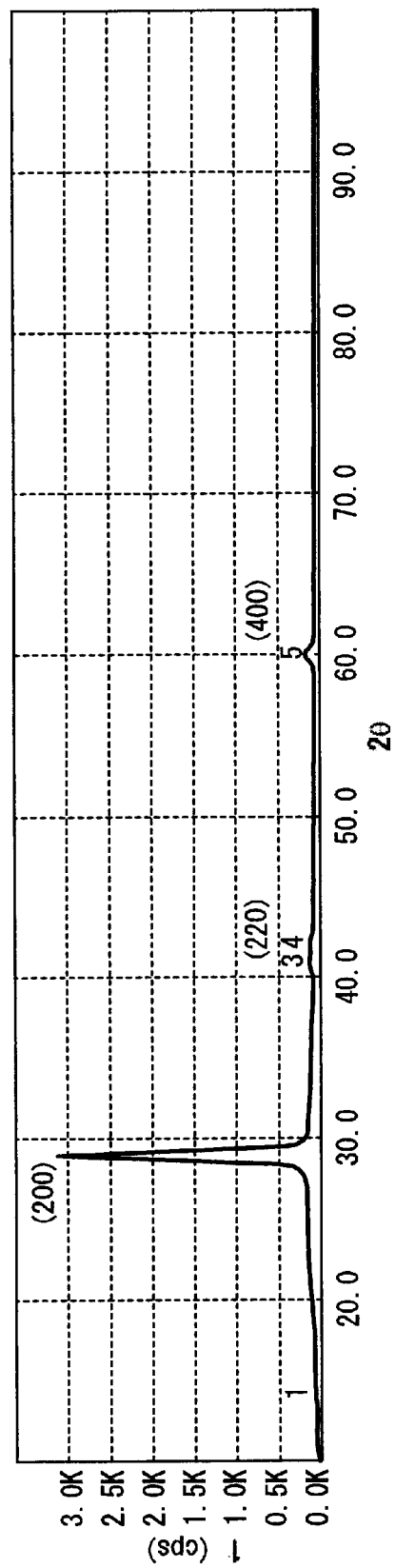
FIG. 10 is a view showing the X-ray diffraction spectrum of Example 19.

The X-ray diffraction spectrum of Example 19 is as shown in FIG. 10.

This spectrum can be indexed in the NaCl-type crystal structure. A diffraction spot indicating distortion of a NaCl-type crystal lattice appeared in the electron beam diffraction. The observation can much easily be performed by use of converged electron beam diffraction method or nano-beam diffraction method depending on the state of the samples.

The locally distorted structure is conceivably formed since the turbulences allowing the entrance of every atom constituting the recording layer are present in the Na-site and Cl-site, as mentioned earlier, whereby Sb—Te bond, Sb—Sb bond, Te—Te bond, Te—Ga bond, Te—Ge bond, or Te—Mn bond is generated and varies adjacent bonding distances.

The same result was also obtained in Examples 20–26.

Figure 11:
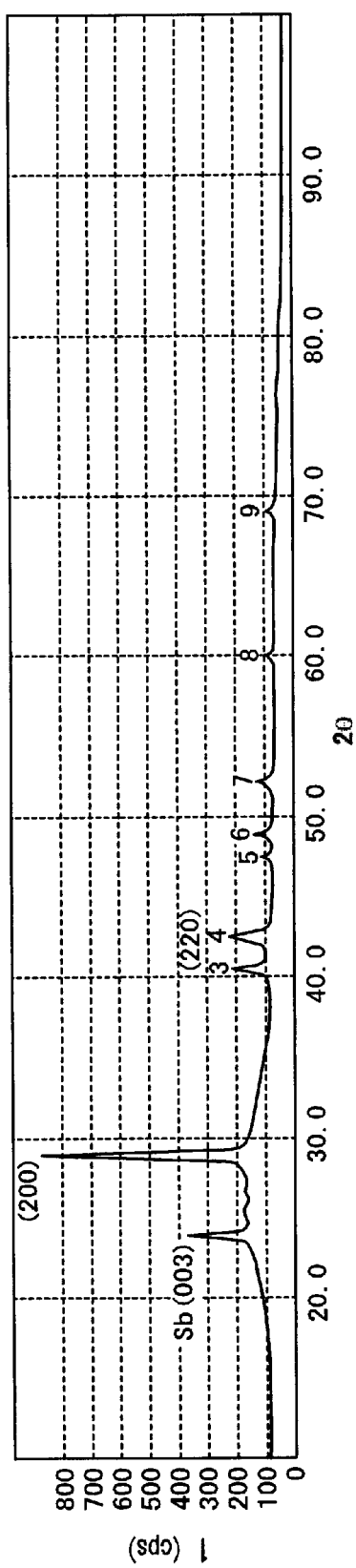
FIG. 11 is a view showing the X-ray diffraction spectrum of Comparative Example 5.

In Comparative Example 5, the same evaluation was performed with 8 atomic percentage of Te, which is smaller than in the recording layer compositions of the present invention. The X-ray diffraction spectrum was shown in FIG. 11.

A peak of Sb appeared in addition to the peak from a general NaCl-type crystal structure. By evaluating the characteristic of this medium, the repetitive recording frequency was as small as 400. Since Te quantity is extremely small with respect to Sb, Sb is presumably precipitated.

In Comparative Example 6, a recording layer consisting only of Ge, Ga, Sb and Te was used with 0 atomic percentage of Mn. In order to achieve the recordable linear rotation rate of 17 m/s, Ga was added in 9 atomic percentage, which is larger compared to the present invention. Consequently, a peak of $Ga_2Te_3$ appeared in X-ray diffraction.

This medium was initially crystallized, however the reflection rate after initial crystallization was not uniform in plan. The reason for this phenomenon is presumed that the initial crystallization was difficult due to a high crystallization temperature of 240° C.

In Comparative Example 7, Ge was determined at 10 atomic percentage which is larger compared to the present invention. Consequently, the recordable linear rotation rate of 17 m/s was not attained because Ge has an effect of decreasing crystallization rate although it has satisfying storage property.

When 17 m/s was attained by adding increased quantities of Ga and Mn, the recording layer had a multiphase structure, which deteriorated the repetition property.

In Comparative Example 8, Ge was determined at 0 atomic percentage. In this case, the repetition property and storage property were remarkably deteriorated.

TABLE 3

|  | Recording Layer (atomic %) | | | | |
| --- | --- | --- | --- | --- | --- |
|  | Mn | Sb | Te | Ge | Ga |
| Example 19 | 4 | 71 | 17 | 4 | 4 |
| Example 20 | 6 | 73 | 15 | 3 | 3 |
| Example 21 | 5 | 70 | 18 | 3 | 4 |
| Example 22 | 8 | 72 | 16 | 2 | 2 |
| Example 23 | 2 | 76 | 14 | 5 | 3 |
| Example 24 | 4 | 70 | 20 | 2 | 4 |
| Example 25 | 5 | 76 | 14 | 3 | 2 |
| Example 26 | 6 | 66 | 22 | 1 | 5 |
| Comparative Example 5 | 10 | 72 | 8 | 5 | 5 |
| Comparative Example 6 | 0 | 67 | 20 | 4 | 9 |
| Comparative Example 7 | 4 | 65 | 16 | 10 | 5 |
| Comparative Example 8 | 8 | 70 | 17 | 0 | 5 |

TABLE 4

|  | Crystal Structure of Recording Layer | Recordable Highest Linear Rotation Rate (m/s) | Repetitive Recording Frequency | Crystallization Temperature (° C.) (10° C./min) | Archival increasing ratio (%) after 80° C., 300 hr | Initial Crystallization | Melting Point (° C.) |
| --- | --- | --- | --- | --- | --- | --- | --- |
| Example 19 | Distorted NaCl-type Structure | 17 | 6000 | 180 | 1.2 | ○ | 545 |
| Example 20 | Distorted NaCl-type Structure | 18 | 6000 | 175 | 1.2 | ○ | 530 |
| Example 21 | Distorted NaCl-type Structure | 17 | 8000 | 180 | 1.2 | ○ | 550 |
| Example 22 | Distorted NaCl-type Structure | 18 | 6000 | 170 | 1.3 | ○ | 535 |
| Example 23 | Distorted NaCl-type Structure | 17 | 7000 | 175 | 1.3 | ○ | 540 |
| Example 24 | Distorted NaCl-type Structure | 17 | 5000 | 180 | 1.2 | ○ | 550 |
| Example 25 | Distorted NaCl-type Structure | 18 | 6000 | 170 | 1.3 | ○ | 540 |

TABLE 4-continued

|  | Crystal Structure of Recording Layer | Recordable Highest Linear Rotation Rate (m/s) | Repetitive Recording Frequency | Crystallization Temperature (° C.) (10° C./min) | Archival increasing ratio (%) after 80° C., 300 hr | Initial Crystallization | Melting Point (° C.) |
|---|---|---|---|---|---|---|---|
| Example 26 | Distorted NaCl-type Structure | 17 | 5000 | 190 | 1.1 | ○ | 535 |
| Comp. Ex. 5 | Multiphase | 17 | 400 | 170 | 9 | ○ | 530 |
| Comp. Ex. 6 | Multiphase | 17 | 600 | 240 | 3 | Difficult | 530 |
| Comp. Ex. 7 | Multiphase | 13 | 3000 | 170 | 2 | ○ | 530 |
| Comp. Ex. 8 | Distorted NaCl-type Structure | 17 | 400 | 180 | 8 | ○ | 530 |

Examples 27–38 and Comparative Examples 9–12

In order to produce recording media having structures shown in Table 5, a lower protection layer, a recording layer, an upper protection layer, and a reflection layer were successively provided by sputtering on a polycarbonate substrate having a track pitch of 0.7 μm, a channel depth of 40 nm, a thickness of 0.6 mm, and a diameter of 120 mm φ.

An environmental protection layer was further provided on the reflection layer by spin coating.

The resulting recording media were initially crystallized, and then subjected to recording at linear rotation rates and recording powers of 11 m/s (13 mW), 13 m/s (15 mW), and 15 m/s (17 mW) respectively. At this time, the wavelength of the recording laser was determined at 635 nm, overwriting repetition was performed in an EFM random pattern, and the recording signal was evaluated with jitter value of a 3T signal.

The storage property was evaluated with the jitter value of the 3T signal of the initial recording (first overwrite) after retaining the initially recorded recording media under 80° C. and 85% RH for 300 hrs.

The results are shown in Tables 6 and 7.

TABLE 6

| Properties | Recording Speed (m/s) | Recording Power (mW) | Jitter after Overwriting (%) | | | | Storage property (Note 1) Jitter % |
|---|---|---|---|---|---|---|---|
|  |  |  | 1 | 1000 | 5000 | 10000 |  |
| Example 27 | 11 | 13 | 7.0 | 7.2 | 7.6 | 8.4 | 7.1 |
|  | 13 | 15 | 6.8 | 7.0 | 7.4 | 8.1 | 6.9 |
|  | 15 | 17 | 6.9 | 7.1 | 7.6 | 8.4 | 7.0 |
| Example 28 | 11 | 13 | 7.1 | 7.2 | 7.6 | 8.5 | 7.2 |
|  | 13 | 15 | 7.0 | 7.2 | 7.7 | 8.6 | 7.1 |
|  | 15 | 17 | 7.0 | 7.2 | 7.8 | 8.8 | 7.1 |
| Example 29 | 11 | 13 | 6.9 | 7.0 | 7.4 | 8.1 | 7.0 |
|  | 13 | 15 | 7.1 | 7.3 | 7.8 | 8.5 | 7.2 |
|  | 15 | 17 | 7.2 | 7.4 | 7.9 | 8.7 | 7.3 |
| Example 30 | 11 | 13 | 7.1 | 7.3 | 8.0 | 8.8 | 7.3 |
|  | 13 | 15 | 7.3 | 7.5 | 8.2 | 9.0 | 7.5 |
|  | 15 | 17 | 7.5 | 7.7 | 8.4 | 9.2 | 7.7 |
| Example 31 | 11 | 13 | 7.2 | 7.3 | 7.6 | 8.3 | 7.3 |
|  | 13 | 15 | 7.4 | 7.5 | 7.8 | 8.6 | 7.5 |
|  | 15 | 17 | 7.7 | 7.8 | 8.2 | 9.1 | 7.8 |
| Example 32 | 11 | 13 | 7.2 | 7.3 | 7.7 | 8.4 | 7.3 |
|  | 13 | 15 | 7.3 | 7.4 | 7.8 | 8.5 | 7.4 |
|  | 15 | 17 | 7.6 | 7.8 | 8.3 | 9.1 | 7.7 |
| Example 33 | 11 | 13 | 7.3 | 7.4 | 7.8 | 8.5 | 7.4 |
|  | 13 | 15 | 7.4 | 7.5 | 7.9 | 8.6 | 7.5 |
|  | 15 | 17 | 7.7 | 7.9 | 8.4 | 9.2 | 7.8 |

TABLE 5

|  | Lower Protection Layer | | Recording Layer | | Upper Protection Layer | | Reflection Layer | |
|---|---|---|---|---|---|---|---|---|
|  | Material (mol %) | Film Thickness | Material (atomic %) | Film Thickness | Material (mol %) | Film Thickness | Material | Film Thickness |
| Example 27 | $(ZnS)_{80}(SiO_2)_{20}$ | 80 nm | $B_3Ga_4Sb_{72}Te_{21}$ | 15 nm | $(ZnS)_{80}(SiO_2)_{20}$ | 35 nm | Al Alloy | 100 nm |
| Example 28 | " | " | $C_3Ga_4Sb_{72}Te_{21}$ | " | " | " | " | " |
| Example 29 | " | " | $Ge_3Al_4Sb_{72}Te_{20}$ | " | " | " | " | " |
| Example 30 | " | " | $Ge_3Zn_8Sb_{70}Te_{20}$ | " | " | " | " | " |
| Example 31 | " | " | $B_2Mn_8Sb_{70}Te_{20}$ | " | " | " | " | " |
| Example 32 | " | " | $B_2Ta_8Sb_{70}Te_{20}$ | " | " | " | " | " |
| Example 33 | " | " | $C_4Zr_3Sb_{73}Te_{20}$ | " | " | " | " | " |
| Example 34 | " | " | $Ge_3Y_4Sb_{73}Te_{20}$ | " | " | " | " | " |
| Example 35 | " | " | $Ge_3Mg_4Sb_{73}Te_{20}$ | " | " | " | " | " |
| Example 36 | " | " | $C_4Ga_4Sb_{72}Te_{20}$ | " | " | " | " | " |
| Example 37 | " | " | $C_4Br_3Sb_{72}Te_{20}$ | " | " | " | " | " |
| Example 38 | " | " | $Ge_4Cl_3Sb_{72}Te_{20}$ | " | " | " | " | " |
| Comp. Ex. 9 | " | " | $Sb_{79}Te_{21}$ | " | " | " | " | " |
| Comp. Ex. 10 | " | " | $Ag_1In_8Sb_{74}Te_{17}$ | " | " | " | " | " |
| Comp. Ex. 11 | " | " | $Ge_3Sb_{79}Te_{18}$ | " | " | " | " | " |
| Comp. Ex. 12 | " | " | $Zn_4Sb_{71}Te_{25}$ | " | " | " | " | " |

TABLE 6-continued

| Properties | Recording Speed (m/s) | Recording Power (mW) | Jitter after Overwriting (%) | | | | Storage property (Note 1) Jitter % |
|---|---|---|---|---|---|---|---|
| | | | 1 | 1000 | 5000 | 10000 | |
| Example 34 | 11 | 13 | 7.1 | 7.3 | 7.7 | 8.6 | 7.2 |
| | 13 | 15 | 7.3 | 7.5 | 7.9 | 7.8 | 7.7 |
| | 15 | 17 | 7.6 | 7.8 | 8.3 | 9.1 | 7.7 |
| Example 35 | 11 | 13 | 7.0 | 7.2 | 7.6 | 8.2 | 7.3 |
| | 13 | 15 | 7.0 | 7.2 | 7.6 | 8.3 | 7.3 |
| | 15 | 17 | 7.1 | 7.3 | 7.8 | 8.6 | 7.4 |
| Example 36 | 11 | 13 | 7.1 | 7.3 | 7.7 | 8.4 | 7.3 |
| | 13 | 15 | 7.2 | 7.4 | 7.8 | 8.5 | 7.4 |
| | 15 | 17 | 7.3 | 7.6 | 7.9 | 8.7 | 7.5 |
| Example 37 | 11 | 13 | 7.3 | 7.5 | 8.1 | 8.9 | 7.6 |
| | 13 | 15 | 7.4 | 7.5 | 8.2 | 9.2 | 7.7 |
| | 15 | 17 | 7.5 | 7.9 | 8.4 | 9.4 | 7.8 |
| Example 38 | 11 | 13 | 7.2 | 7.3 | 7.8 | 8.5 | 7.4 |
| | 13 | 15 | 7.2 | 7.3 | 7.9 | 8.7 | 7.4 |
| | 15 | 17 | 7.3 | 7.4 | 8.1 | 8.9 | 7.5 |

Note 1:
Jitter value of 3T recording mark in first overwriting after retaining at 80° C. and 85% RH for 300 hrs.

TABLE 7

| Properties | Recording Speed (m/s) | Recording Power (mW) | Jitter after Overwriting | | | | Storage property (Note 1) Jitter % |
|---|---|---|---|---|---|---|---|
| | | | 1 | 1000 | 5000 | 10000 | |
| Comp. Ex. 9 | 11 | 13 | 7.2 | 7.4 | 7.9 | 8.7 | Recording Mark Erased |
| | 13 | 15 | 7.5 | 7.7 | 8.3 | 9.2 | Recording Mark Erased |
| | 15 | 17 | 8.0 | non-overwritable | | | Recording Mark Erased |
| Comp. Ex. 10 | 11 | 13 | 7.1 | 7.7 | 11.2 | 16.5 | 7.9 |
| | 13 | 15 | 7.4 | 8.1 | 11.9 | 17.6 | 8.3 |
| | 15 | 17 | 8.2 | 8.5 | 12.3 | 18.3 | 9.2 |
| Comp. Ex. 11 | 11 | 13 | 7.1 | 7.2 | 7.6 | 8.2 | 7.2 |
| | 13 | 15 | 7.3 | 7.4 | 7.8 | 8.5 | 7.4 |
| | 15 | 17 | 7.4 | non-overwritable | | | 7.6 |
| Comp. Ex. 12 | 11 | 13 | 7.1 | 7.3 | 8.2 | 9.2 | Recording Mark Erased |
| | 13 | 15 | 7.3 | 7.5 | 8.4 | 9.5 | Recording Mark Erased |
| | 15 | 17 | 7.5 | 7.7 | 8.7 | 9.8 | Recording Mark Erased |

Note 1:
Jitter value of 3T recording mark in first overwriting after retaining at 80° C., 85% RH for 300 hrs.

As is apparent from Tables 6 and 7, in the recording medium of the third embodiment of the present invention, the overwrite property and storage property under a high linear velocity are extremely satisfying when its recording layer is formed of Te, Sb, at least one element selected from B, C and Ge, and at least one element selected from Al, Ga, Zn, Mn, Ta, Zr, Y, Mg, Ca, Br and Cl among elements other then the above elements and having ratios of ionicity to Te within 5–28%.

Namely, as long as the constituting materials of the present invention are used in a determined range, recording and erasing can be performed under a high linear velocity, and recording media stable over a long period of time may be provided.

Concretely, $Sb_{79}Te_{21}$ of Comparative Example 9 was extremely poor in storage property, and not overwritable at a high linear velocity of 15 m/s.

In Comparative Example 11, Ge was added to the above to improve the storage property. However, this recording medium is not recordable at a high linear velocity of 15 m/s.

Therefore, in Comparative Example 12, Zn was added to improve the linear velocity. However, the storage property is extremely poor.

$Ag_1In_8Sb_{74}Te_{17}$ of Comparative Example 10 was poor in repetition property.

By using the recording material of the third embodiment of this invention, the disadvantages of these comparative examples are solved.

According to the embodiments 1–18, reliable recording media recordable at high density in a wide linear velocity range from low linear velocity to high linear velocity, having improved overwrite property, storage property or recording sensitivity, and also capable of easy initial crystallization may be obtained.

According to the embodiments 19–26, a recording method suitable for high-density and high-linear velocity recording may be obtained.

According to the embodiment 27, a recording method with application of the embodiments 19–26 to CAV method or CLV method may be obtained.

What is claimed is:

1. An optical recording medium comprising:
   a recording layer which comprises a phase-change recording material causing a reversible phase change between a crystalline phase and an amorphous phase by irradiation with an electromagnetic wave;
   wherein the phase-change recording material mainly comprises materials expressed by the composition formula $X\alpha Ge\beta Mn\gamma Sb\delta Te\epsilon$ and each of the components fulfills following conditions:
   $0 \leq \alpha \leq 5$
   $1 \leq \beta \leq 5$
   $1 \leq \gamma \leq 10$
   $65 \leq \delta < 80$
   $15 \leq \epsilon \leq 25$
   $\alpha \leq \gamma$
   (where X expresses at least one of Ga and Sn, $\alpha$, $\beta$, $\gamma$, $\delta$, and $\epsilon$ expresses atomic percentage, and fulfills $\alpha+\beta+\gamma+\delta+\epsilon=100$).

2. An optical recording medium according to claim 1, wherein a crystallization temperature at temperature rise rate of 10° C./min of the recording layer is 150–220° C.

3. An optical recording medium according to claim 1, wherein at least a lower protection layer, the recording layer, an upper protection layer, and a reflection layer are provided on a substrate, and the reflection layer consists of Ag or an alloy containing 95% or more of Ag.

4. An optical recording medium according to claim 3, wherein the Ag alloy is AgxCuyNi100−x−y (where x and y each expresses atomic percentages, x≧95, 0<y≦5, and 100−x−y>0).

5. An optical recording medium according to claim 4, wherein the upper protection layer comprises a mixture of ZnS, $ZrO_2$, $Y_2O_3$ and $SiO_2$.

6. An optical recording medium according to claim 3, wherein the upper protection layer contains sulfur, and an upper second protection layer is provided between the upper protection layer and the reflection layer.

7. An optical recording medium according to claim 6, wherein the upper second protection layer comprises at least one of Si and SiC as main component.

8. An optical recording medium according to claim 6, wherein the upper second protection layer comprises at least any one of a mixture of $ZrO_2$ and $Y_2O_3$, MgO, and TiOx as main component.

9. An optical recording medium according to claim 6, wherein a film thickness of the upper second protection layer is 2–10 nm.

10. An optical recording medium according to claim 1, wherein the optical recording medium is recordable at a linear rotation rate of 7–17.5 m/s.

11. An optical recording medium comprising:
a recording layer which comprises a phase-change recording material causing a reversible phase change between a crystalline phase and an amorphous phase by irradiation with an electromagnetic wave;
wherein the phase-change recording material mainly comprises materials expressed by the composition formula Ge$\kappa$Ga$\lambda$Mn$\mu$Sb$\nu$Te$\xi$ and each of the components fulfills following quantities:
$1 \leq \kappa \leq 5$
$1 \leq \lambda \leq 5$
$1 \leq \mu \leq 10$
$65 \leq \nu \leq 81$
$13 \leq \xi \leq 24$
(where $\kappa$, $\lambda$, $\mu$, $\nu$ and $\xi$ each expresses atomic percentage, and $\kappa+\lambda+\mu+\nu+\xi=100$).

12. An optical recording medium according to claim 11, wherein a structure of the crystalline phase of the recording layer is a statistic NaCl-type structure having turbulences allowing entrance of every atom constituting the recording layer in the Na-site and Cl-site.

13. An optical recording medium according to claim 11, wherein a statistic Na—Cl structure which is the structure of the crystalline phase of the recording layer is distorted.

14. An optical recording medium according to claim 11, wherein a crystallization temperature at temperature rise rate of 10° C./min of the recording layer is 150–200° C.

15. An optical recording medium according to claim 11, wherein a melting point of the recording layer is 530–560° C.

16. An optical recording medium according to claim 11, wherein the optical recording medium is recordable at a linear rotation rate of 7–17.5 m/s.

17. An optical recording medium comprising:
a recording layer which comprises a phase-change recording material causing a reversible phase change between a crystalline phase and an amorphous phase by irradiation with an electromagnetic wave;
wherein the phase-change recording material mainly comprises materials expressed by the composition formula A$\phi$D$\chi$Sb$\phi$Te$\omega$, and each of the components fulfills following quantities, and a crystallization temperature of the recording layer at temperature rise rate of 10° C./min is less than 240° C.;
$2 \leq \phi \leq 8$
$3 \leq \chi \leq 10$
$60 \leq \phi \leq 80$
$15 \leq \omega \leq 30$
(where A expresses at least one element selected from Ge, B and C; D expresses one or a plurality of elements having a ratio of ionicity to Te within the range of 5–28%; $\phi$, $\chi$, $\phi$, and $\omega$ each expresses atomic percentage, and $\phi+\chi+\phi+\omega+=100$).

18. An optical recording medium according to claim 17, wherein the element D is selected from Al, Ga, Zn, Mn, Ta, Zr, Y, Mg, Ca, Br and Cl.

19. An optical recording medium according to claim 17, wherein a crystallization time in erasing information is 100 nsec or less.

20. An optical recording medium according to claim 17, wherein the optical recording medium is recordable at a linear rotation rate of 7–17.5 m/s.

21. A method for recording to an optical recording medium comprising:
a step for irradiating a multi-pulse light to form a recording mark having a prescribed length of which a recording time is expressed as nT (n is an integer of 2 or more, and T is a reference clock);
wherein the multi-pulse light comprises a pulse train having;
  a) a first heating pulse and a first cooling pulse;
  b) an intermediate heating pulse and an intermediate cooling pulse; and
  c) a last heating pulse and a last cooling pulse;
and when a heating pulse time is expressed as Opi and a cooling pulse time is expressed as Fpi (where i expresses the i-th pulse part when taking the heating pulse and cooling pulse as a pair of pulse parts), a first heating pulse time and a head cooling pulse time of the pulse train are respectively expressed by OP1 and FP1, a last heating pulse time and a last cooling pulse time of the pulse train are respectively expressed by OPm and FPm, one or a plurality of an intermediate heating pulse time and an intermediate cooling pulse time of the pulse train are respectively expressed by OPj and FPj (j=2 . . . , m−1); wherein
  i) the number of pulse m is equal to L when the length of the prescribed recording mark n is 2L (L is an integer of 2 or more);
  ii) the number of pulse m is equal to L when the length of the prescribed recording mark n is 2L+1 (L is an integer of 1 or more); and
  the length of each pulse part OPi+FPi (i=1, . . . , m) is substantially two times longer compared to the reference clock T.

22. A method for recording to an optical recording medium according to claim 21, wherein a start position of the first heating pulse and/or an end position of the last cooling pulse are controlled by a variable quantity proportional to the reference clock, and the control is performed at every mark length.

23. A method for recording to an optical recording medium according to claim 21, wherein the first heating pulse time, the intermediate heating pulse time and the last heating pulse time are controlled with a time determined by the sum of 1) a time proportional to the reference clock and 2) a fixed time, and the control is performed at every mark length.

24. A method for recording to an optical recording medium according to claim 21, wherein the last cooling pulse time is 2.5 nsec or more.

25. A method for recording to an optical recording medium according to claim 21, wherein a start position of an intermediate heating pulse time for a recording mark having length of n=2L+1 (L is an integer of 1 or more) is delayed compared to the start position of the intermediate heating pulse time having length of n=2L, the delay is based on 0.5T.

26. A method for recording to an optical recording medium according to claim 21, wherein a recording power Pw to be emitted within the heating pulse time, a bottom power Pb to be emitted within the cooling pulse time, and an erasing power Pe for erasing respectively satisfies the relation Pw>Pe>Pb, Pb and a reproducing power Pr satisfies the relation Pb≦Pr, and the recording power Pw varies according to linear rotation rate.

27. A method for recording to an optical recording medium according to claim 21, wherein a correction pulse part is provided after the last cooling pulse, a power thereof defined as Pc satisfies the relation Pe>Pc>Pb, and the pulse correction time varies for every recording mark.

28. A method for recording to an optical recording medium according to claim 21, wherein a correction pulse part is provided after the last cooling pulse, a power thereof defined as Pc satisfies the relation Pc≦Pe, and the correction pulse time varies for every recording mark.

29. A method for recording to an optical recording medium according to claim 21, wherein the method is applied to a method for recording at a constant linear density, and a constant linear rotation rate regardless of recording radial position, by a fixed reference clock at the constant linear rotation rate.

30. A method for recording to an optical recording medium according to claim 21, wherein the method is applied to a method for recording which utilizes a continuous change of linear velocity according to radial positions ranging from an inner peripheral to an outer peripheral, accompanied by a continuous change in a reference clock.

* * * * *